United States Patent
Nagornykh

(10) Patent No.: US 12,130,125 B2
(45) Date of Patent: *Oct. 29, 2024

(54) CHROMATIC RANGE SENSOR SYSTEM WITH SPHERICAL CALIBRATION OBJECT AND METHOD

(71) Applicant: Mitutoyo Corporation, Kanagawa-ken (JP)

(72) Inventor: Pavel Ivanovich Nagornykh, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 375 days.

This patent is subject to a terminal disclaimer.

(21) Appl. No.: 17/500,782

(22) Filed: Oct. 13, 2021

(65) Prior Publication Data

US 2023/0113768 A1 Apr. 13, 2023

(51) Int. Cl.
*G01B 11/00* (2006.01)

(52) U.S. Cl.
CPC .................. *G01B 11/005* (2013.01)

(58) Field of Classification Search
CPC ............ G01J 2001/4247; G01J 1/4257; G01B 11/2504; G01B 11/2518; G01B 11/04; G01B 11/24
See application file for complete search history.

(56) References Cited

U.S. PATENT DOCUMENTS

| | | | |
|---|---|---|---|
| 4,908,951 A | 3/1990 | Gurny | |
| 5,825,666 A | 10/1998 | Freifeld | |
| 5,995,580 A * | 11/1999 | Schaller | A61B 6/027 378/15 |
| 6,067,165 A | 5/2000 | Matsumiya et al. | |
| 7,324,682 B2 | 1/2008 | Wasserman | |
| 7,454,053 B2 | 11/2008 | Bryll et al. | |
| 7,873,488 B2 | 1/2011 | Nahum et al. | |
| 7,876,456 B2 | 1/2011 | Sesko | |
| 7,990,522 B2 | 8/2011 | Sesko | |
| 8,085,295 B2 | 12/2011 | Tobiason et al. | |
| 8,194,251 B2 | 6/2012 | Emtman et al. | |
| 8,229,694 B2 | 7/2012 | Nakagawa et al. | |
| 8,817,240 B2 | 8/2014 | Jones et al. | |
| 9,151,602 B2 | 10/2015 | Noda et al. | |
| 9,746,303 B2 | 8/2017 | Nakagawa et al. | |

(Continued)

*Primary Examiner* — Rebecca C Bryant
(74) *Attorney, Agent, or Firm* — Seed IP Law Group LLP

(57) ABSTRACT

A method provides distance calibration data for a chromatic range sensor system with a chromatic range sensor optical pen configured to focus different wavelengths at different distances along a distance measurement axis. The chromatic range sensor optical pen is arranged in a relationship relative to a spherical calibration object that has a nominally spherical calibration surface. Relative movement of the chromatic range sensor optical pen in relation to the nominally spherical calibration surface is controlled so as to perform a spiral scan of a portion of the nominally spherical calibration surface. Distance indicating data is determined as corresponding to the distances between the chromatic range sensor optical pen and surface points on the nominally spherical calibration surface as the spiral scan is performed. Distance calibration data for the chromatic range sensor system is determined based on the distance indicating data.

23 Claims, 12 Drawing Sheets

(56) References Cited

U.S. PATENT DOCUMENTS

| | | |
|---|---|---|
| 9,952,045 B2 | 4/2018 | Yasuno |
| 10,429,167 B2 | 10/2019 | Nakagawa et al. |
| 2005/0031191 A1 | 2/2005 | Venkatachalam |
| 2006/0109483 A1 | 5/2006 | Marx et al. |
| 2010/0208486 A1 | 8/2010 | Gladnick et al. |
| 2012/0050722 A1 | 3/2012 | Emtman et al. |
| 2012/0050723 A1 | 3/2012 | Emtman et al. |
| 2015/0159998 A1 | 6/2015 | Altendorf |
| 2015/0211850 A1 | 7/2015 | Harsila |
| 2017/0248399 A1 | 8/2017 | Takahama |
| 2021/0333083 A1 | 10/2021 | Tobiason |
| 2021/0333093 A1 | 10/2021 | Tobiason |

\* cited by examiner

| DISTANCE INDICATING COORDINATE (DIC) | MEASUREMENT DISTANCE (MICRONS) |
|---|---|
| 1 | OUT OF RANGE |
| ≈ | ≈ |
| 104.1 | 36.9029 |
| 104.2 | 37.0303 |
| 104.3 | 37.1804 |
| 104.4 | 37.3557 |
| 104.5 | 37.4863 |
| ≈ | ≈ |
| 604.1 | 381.6882 |
| 604.2 | 381.7224 |
| 604.3 | 381.7565 |
| ≈ | ≈ |
| 990.1 | 486.6540 |
| 990.2 | 486.6733 |
| ≈ | ≈ |
| 1024 | OUT OF RANGE |

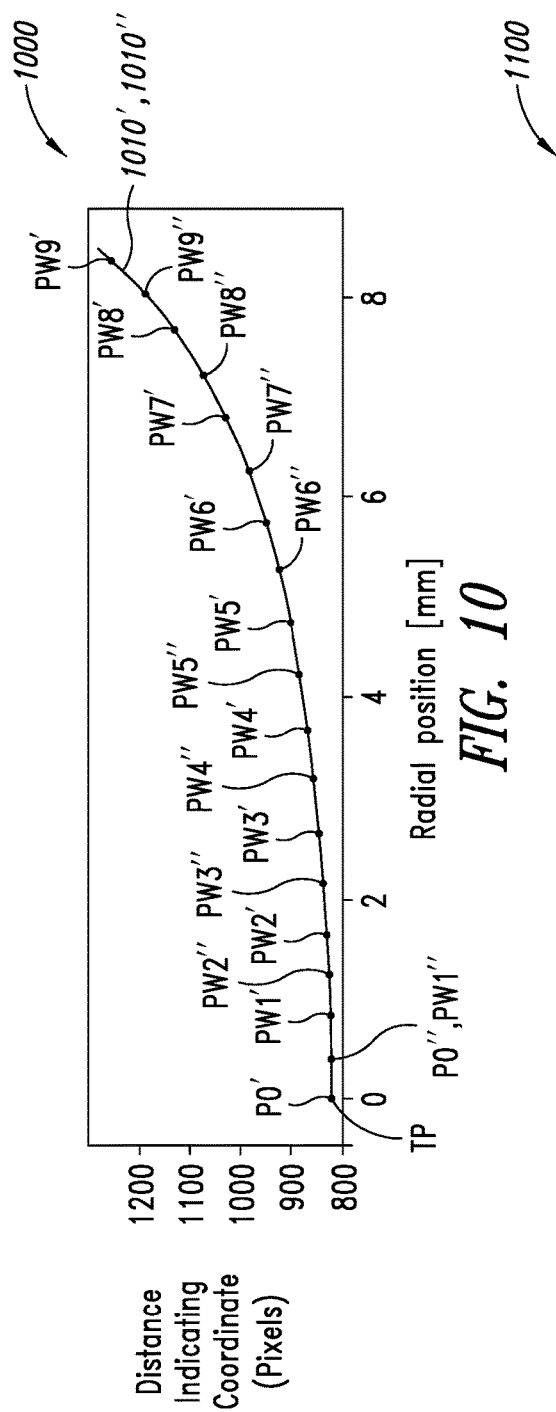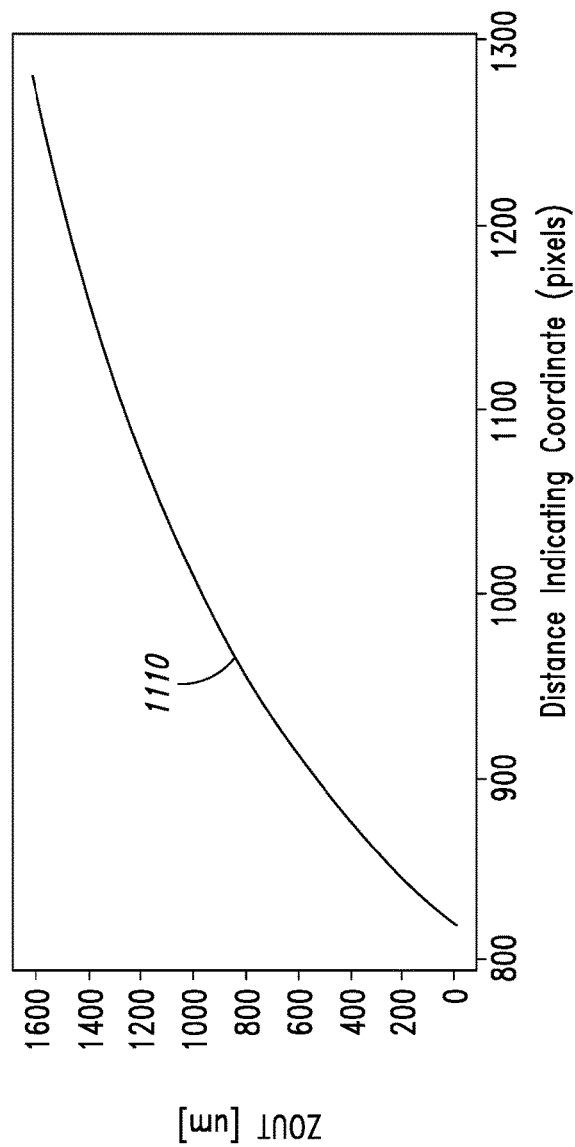
FIG. 10
FIG. 11

CHROMATIC RANGE SENSOR SYSTEM WITH SPHERICAL CALIBRATION OBJECT AND METHOD

BACKGROUND

Technical Field

The disclosure relates generally to precision measurement instruments, and more particularly to chromatic range sensors such as may be used with measuring machines for determining measurements of workpieces.

Description of the Related Art

It is known to use chromatic confocal techniques in optical range sensors (e.g., including height, distance, etc., sensors). As described in U.S. Pat. No. 7,876,456 (the '456 patent), which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the aperture. All of the other wavelengths are poorly focused on the aperture, and so will not couple much power into the fiber. Therefore, for the light returned through the fiber, the signal level will be greatest for the wavelength corresponding to the surface height (i.e., distance) to the surface. A spectrometer-type detector measures the signal level for each wavelength, in order to determine the surface height (e.g., for which the wavelength that is well-focused on the surface will generally form the highest peak in the overall detector signal).

Certain manufacturers refer to practical and compact chromatic range sensing (CRS) systems that operate as described above, and that are suitable for use in an industrial setting, as chromatic point sensors (CPS) or chromatic line sensors, or the like. A compact chromatically-dispersive optical assembly used with such systems is referred to as an "optical pen," or a "pen." The optical pen is connected through an optical fiber to an electronic portion of the chromatic range sensor system. The electronic portion includes a light source that transmits light through the fiber to be output from the optical pen, and also provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength position coordinate" as indicated by a peak or centroid of the intensity profile (e.g., as corresponding to the wavelength that is well-focused on the surface), and the resulting pixel coordinate of the peak and/or centroid is used with a lookup table to determine the distance to the surface. This pixel coordinate may be determined with sub-pixel resolution, and may be referred to as the "distance-indicating coordinate" or "distance indicating pixel coordinate."

An important issue with chromatic range sensors is the stability of their components relative to their calibration. Chromatic range sensors provide very high resolution and accuracy (e.g. sub-micron resolution and accuracy) based on distance calibration data that correlates known measurement distances with the resulting dominant wavelength position coordinate along the detector array. At the level of resolution and accuracy provided by chromatic range sensors, component behavior inevitably drifts relative to the behavior provided at the time of factory calibration, resulting in measurement errors. Known methods of calibration generally require equipment and/or a level of expertise that is impractical for end-users to provide (e.g., in particular while the chromatic range sensor is attached to a measuring machine, etc.) Thus, if the measurement accuracy degrades, or if a user desires to replace a specific component of the chromatic range sensor (such as the optical pen), the entire unit may need to be sent back to the factory for recalibration. In addition, in some implementations it may be desirable to be able to install or maintain a chromatic range sensor on a measuring machine without prior factory calibration (e.g., for faster delivery, lower preparation costs, etc.) In relation to such issues, providing improved, simplified, and/or more reliable calibration (e.g., for initial calibration and/or recalibration, etc.) for chromatic range sensors (e.g., while attached to a measuring machine, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for determining distance calibration data for a chromatic range sensor system with a chromatic range sensor optical pen that is coupled to a measuring machine is provided. The chromatic range sensor optical pen is configured to focus different wavelengths at different distances proximate to a surface to be measured. The chromatic range sensor optical pen is arranged in a relationship relative to a spherical calibration object that has a nominally spherical calibration surface. The measuring machine is controlled to achieve relative movement of the chromatic range sensor optical pen in relation to the nominally spherical calibration surface. The relative movement of the chromatic range sensor optical pen is in a spiral pattern so as to perform a spiral scan of a portion of the nominally spherical calibration surface for which distance indicating data is determined as corresponding to distances between the chromatic range sensor optical pen and surface points on the nominally spherical calibration surface as the spiral scan is performed. Distance calibration data for the chromatic range sensor system is determined based on the distance indicating data.

In some implementations, a system is provided which includes a measuring machine, a chromatic range sensor system and a spherical calibration object. The measuring machine includes a motion controller. The system is configured to utilize the motion controller to achieve relative movement of the chromatic range sensor optical pen in relation to the nominally spherical calibration surface. A spiral scan of the nominally spherical calibration surface is performed for determining distance indicating data which is utilized to determine distance calibration data.

In some implementations, the chromatic range sensor system includes a chromatic range sensor optical pen, an illumination source, a wavelength detector, and a processing portion. The illumination source is configured to generate multi-wavelength input light having an input spectral profile that is input to the chromatic range sensor optical pen. The wavelength detector includes a plurality of pixels with respective pixel positions distributed along a wavelength measurement axis of the wavelength detector. The chromatic range sensor system is configured such that, when the chromatic range sensor optical pen is operably positioned relative to a surface to perform measurement operations, the chromatic range sensor optical pen inputs the input spectral profile and outputs corresponding radiation to the surface and receives reflected radiation from the surface and outputs the reflected radiation to the wavelength detector. The processing portion configured to determine distance indicating data resulting from relative movement of the chromatic range sensor optical pen in relation to the nominally spherical calibration surface. The relative movement of the chromatic range sensor optical pen is in a spiral pattern so as to perform a spiral scan of a portion of the nominally spherical calibration surface, from which the distance indicating data is determined as corresponding to distances between the chromatic range sensor optical pen and surface points on the nominally spherical calibration surface as the spiral scan is performed. The distance calibration data is determined based on the distance indicating data.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 10 illustrates a distance indicating coordinate versus radial position curve including values from FIGS. 9A and 9B;

FIG. 11 is a diagram of a representation of CRS distance calibration data, as determined by the process illustrated by FIGS. 8-10.

DETAILED DESCRIPTION

Figure 1:
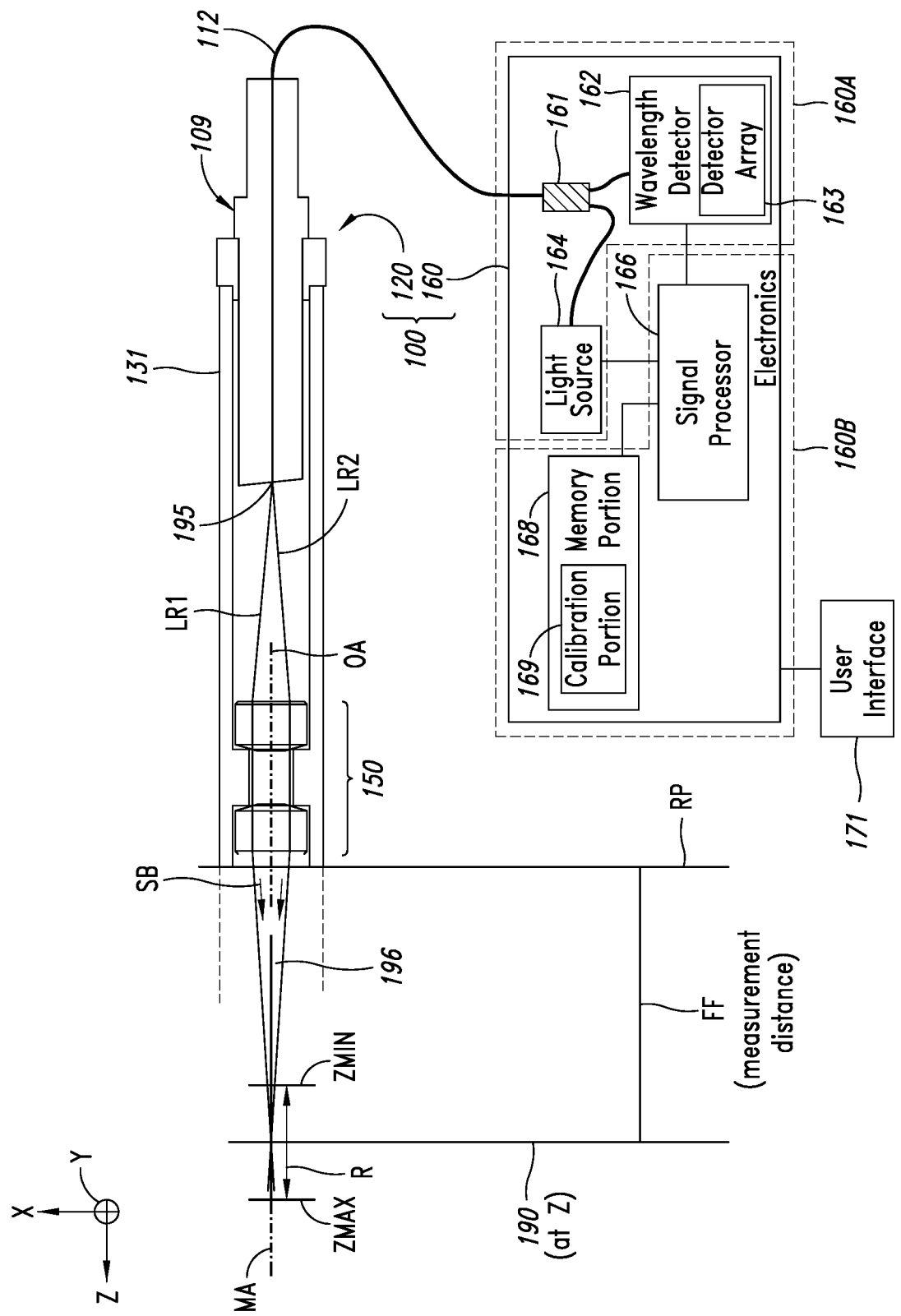
FIG. 1 is a block diagram of an exemplary chromatic range sensor (CRS) system including an optical pen.

FIG. 1 is a block diagram of an exemplary chromatic range sensor (CRS) system 100 of a first type based on operating principles that are desirable to employ in conjunction with a measuring machine. The CRS system 100 has certain similarities to systems described in U.S. Pat. Nos. 7,876,456 and 7,990,522 (the '456 and '522 patents, respectively), which are hereby incorporated herein by reference in their entireties. As shown in FIG. 1, the CRS system 100 includes an optical pen 120, an electronics portion 160, and a user interface portion 171. It will be appreciated that the CRS system 100 shown in FIG. 1 is a chromatic point sensor (CPS) system (i.e., for which the optical pen 120 is a chromatic point sensor) which in some instances may measure a single measurement point at a time. However, in various embodiments alternative types of chromatic range sensor systems, such as a chromatic line sensor, may be utilized.

The optical pen 120 includes a fiber optic connector 109, a housing 131 (e.g. an assembly tube), and an optics portion 150. The fiber optic connector 109 is attached to the end of the housing 131. In various implementations, the fiber optic connector 109 may be oriented at an angle relative to the housing 131. The fiber optic connector 109 receives an in/out optical fiber (not shown in detail) through a fiber optic cable 112 which encases it. The in/out optical fiber outputs source light through a fiber aperture 195 and receives reflected measurement signal light through the fiber aperture 195.

In operation, broadband (e.g. white) source light emitted from the fiber end through the fiber aperture 195 is focused by the optics portion 150, which includes a lens or lenses that provide an axial chromatic dispersion, such that the focal point along the optical axis OA is at different distances depending on the wavelength of the light, as is known for chromatic confocal sensor systems. The source light forms a measurement beam 196 that includes a wavelength that is focused on a surface 190 (e.g., a surface of a workpiece or a calibration object, etc.) at a position Z relative to the optical pen 120. Upon reflection from the surface 190, reflected light is refocused by the optics portion 150 onto the fiber aperture 195. The operative source light and reflected light are bounded by the limiting rays LR1 and LR2. Due to the axial chromatic dispersion, only one wavelength will have a front focus dimension FF that matches the measurement distance (e.g., the measurement distance Z) from the optical pen 120 (e.g., from a reference position RP that is fixed relative to the optical pen 120) to the location on the workpiece surface 190. The optical pen is configured such that the wavelength that is best focused at the surface 190 will also be the wavelength of the reflected light that is best focused at the fiber aperture 195. The fiber aperture 195 spatially filters the reflected light such that predominantly the best focused wavelength passes through the fiber aperture 195 and into the core of the optical fiber cable 112. As described in more detail below and in the incorporated references, the optical fiber cable 112 routes the reflected signal light to a wavelength detector 162 that is utilized for determining the wavelength having the dominant intensity, which corresponds to the measurement distance to the surface 190.

The electronics portion 160 includes a fiber coupler 161, the wavelength detector 162, a light source 164, a signal processor 166 and a memory portion 168. In various embodiments, the wavelength detector 162 includes a spectrometer or spectrograph arrangement wherein a dispersive optics portion (e.g. a grating) receives the reflected light through the optical fiber cable 112 and transmits the resulting spectral intensity profile to a detector array 163. The wavelength detector 162 may also include related signal processing (e.g. provided by the signal processor 166, in some embodiments) that removes or compensates certain detector-related error components from the profile data. Thus, certain aspects of the wavelength detector 162 and the signal processor 166 may be merged and/or indistinguishable in some embodiments. In various implementations, the signal processor 166 and/or the wavelength detector 162 and/or other signal processors, computing systems, etc., that are utilized for related processing may be referenced as a processing portion of the CRS system 100.

The white light source 164, which is controlled by the signal processor 166, is coupled through the optical coupler 161 (e.g. a 2×1 optical coupler) to the fiber cable 112. As described above, the light travels through the optical pen 120 which produces longitudinal chromatic aberration so that its focal length changes with the wavelength of the light. The wavelength of light that is most efficiently transmitted back through the fiber is the wavelength that is in focus on the surface 190 at the position Z. The reflected wavelength-dependent light intensity then passes through the fiber coupler 161 again so that approximately 50% of the light is directed to the wavelength detector 162, which may receive a spectral intensity profile distributed over an array of pixels along a wavelength measurement axis of the detector array 163, and operate to provide corresponding profile data as described in more detail in the incorporated references.

Briefly, the subpixel-resolution distance-indicating coordinate (DIC) of the profile data (e.g., see FIG. 3) is calculated by the signal processor 166, and the DIC (in subpixels) indicates the measurement distance Z to the location on the surface 190 (in microns) via a distance calibration lookup table or the like, which is stored in a calibration portion 169 of the memory portion 168, (e.g., as described below with respect to FIGS. 4A, 4B and 11). In accordance with previously known methods, the DIC may be determined by various techniques (e.g., in accordance with the centroid of the intensity profile data included in a peak region, etc.) In various implementations, the profile data may be used to determine the DIC with subpixel resolution, as will be described in more detail below.

The optical pen 120 generally has a measurement range R that is bound by a minimum range distance ZMIN and a maximum range distance ZMAX. The measurement range R in some example instances of known optical pens may be approximately 1/10th of the nominal standoff or working distance from the end of the pen (e.g. in the range of tens of microns to a few millimeters). It should be appreciated that in some implementations the electronics portion 160 may be located away from the optical pen 120. For example, it has been known to mount an optical pen analogous to the optical pen 120 shown in FIG. 1 on a CMM using a customized bracket, and to route an optical fiber analogous to the optical fiber cable 112 along a makeshift path on the outside of CMM components to a remotely located electronics analogous to the electronics portion 160.

In various implementations (e.g., as will be described in more detail below with respect to FIG. 6), a group of components in a light source and wavelength detector portion 160A (e.g. including the wavelength detector 162 and light source 164) may be included inside a CRS optical probe assembly in some embodiments. A group of components in a measurement signal processing and control circuit 160B (e.g. including the signal processor 166 and memory portion 168) may be located remotely outside of the CRS optical probe assembly, if desired (e.g. to maintain low probe weight and compact probe size).

As further illustrated in FIG. 1, the user interface portion 171 is coupled to the electronics portion 160 and provides a user interface that is configured to receive user input used for the operation of the CRS system 100, such as a user command to select various operating parameters, via any suitable means such as a keyboard, touch sensor, mouse, etc. In exemplary embodiments, the user interface portion 171 may include one or more operation mode selecting elements (e.g., user-selectable buttons) operable by a user to select one of a plurality of operation modes of the CRS system 100 (e.g., a measurement mode, a calibration mode, etc.) The user interface portion 171 is also configured to display information on a screen, such as one or more distances successfully determined/measured by the CRS system 100.

FIG. 1 includes orthogonal XYZ coordinate axes, as a frame of reference. The Z direction is defined to be parallel to the optical axis (OA), which is the distance measurement axis, of the optical pen 120. As illustrated in FIG. 1, during operation, the surface 190 (e.g., of a workpiece or calibration object to be measured) is located/placed along the optical axis OA.

Figure 2:
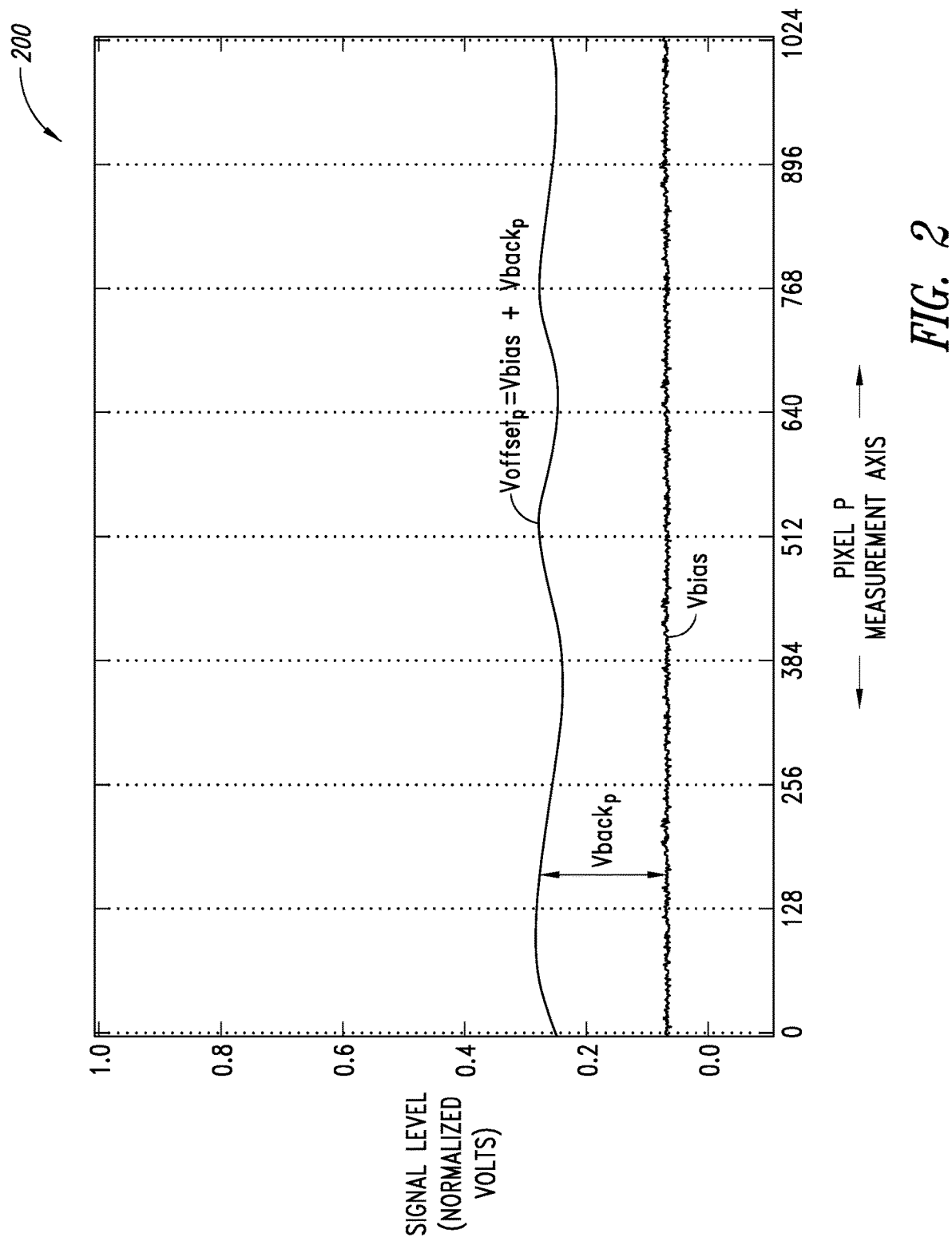
FIG. 2 is a diagram of a system noise (bias) profile from a CRS system illustrating wavelength-dependent voltage offset signal levels for the pixels in a detector array when no measurement surface is present.

The following description of FIG. 2 outlines certain known background signal processing and/or calibration operations. FIG. 2 is a diagram 200 of a system noise (bias) profile from a CRS system, illustrating voltage offset signal levels Voffset(p) for the pixels in a detector array 163 when no measurement surface is present within the nominal total measurement range of the CRS system. In such a case, there is no intentionally reflected light and hence no significant or dominant wavelength peak in the resulting intensity profile. The voltage offset signal Voffset(p) is plotted in normalized volts, for each of 1,024 pixels along the wavelength measurement axis of the detector array 163. "Normalized volts" assigns a value of 1.0 to the saturation voltage of the detector array 163. The voltage offset signal Voffset(p) includes a bias signal level Vbias, which is relatively consistent across the detector array, and a background signal component Vback(p), which is shown as varying across the detector array.

The variable background signal Vback(p) represents signals such as background light from wavelength-dependent spurious reflections and the like in the chromatic point sensor, as well as due to the dark current of the various pixels p. In various embodiments, it is advantageous if the signal components Vback(p) (or signals that show the same variation, such as the voltage offset signals Voffset(p)) are stored for calibration or compensation of the pixel array of the detector array 163, and used to compensate all subsequent profile data signals from each pixel p (e.g. by subtraction), on an ongoing basis. Thus, it will be understood that the background signal component Vback(p) is assumed to be compensated in a known manner in various embodiments, and it is not necessary that it be further explicitly considered or described in relation to the various intensity profiles or inventive signal processing operations, or the like, described below.

Figure 3:
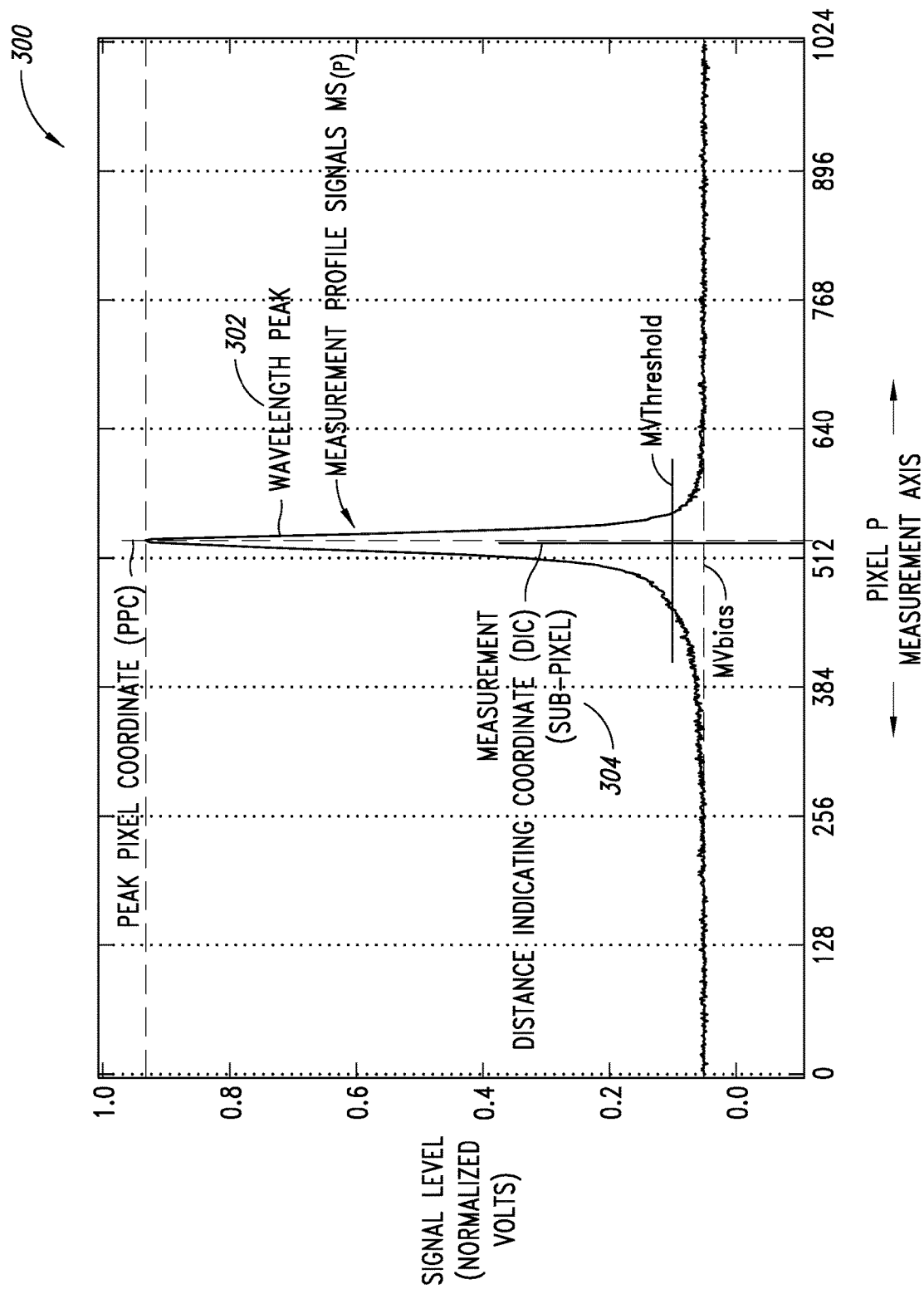
FIG. 3 is a diagram of an intensity profile from a CRS system illustrating a valid wavelength peak produced by a wavelength reflected by a surface, wherein the pixel position of the peak corresponds to a measurement distance to the surface.
Figures 4A, 4B:
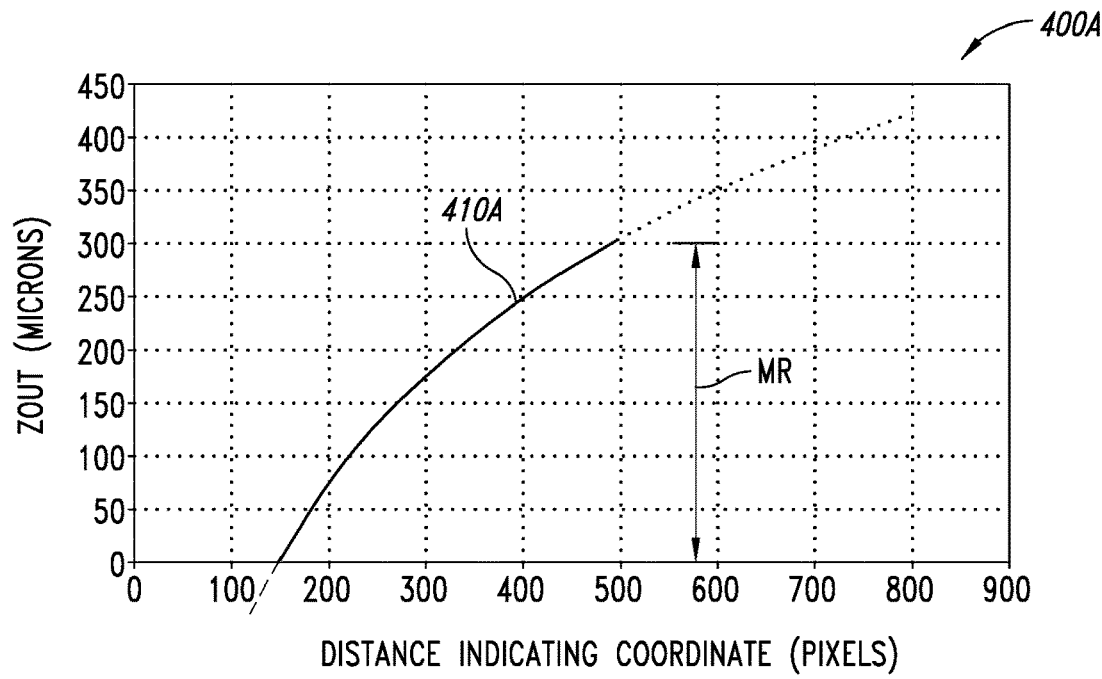
FIG. 4A is a diagram of the first representation of CRS distance calibration data, which correlates distance-indicating pixel coordinates with known measurement distances to a measured workpiece surface.
FIG. 4B is a diagram of a second representation of CRS distance calibration data, comprising an example CRS distance calibration lookup table, which references distance-indicating coordinates (DIC) to corresponding measurement distances of a CRS system.

The following description of FIGS. 3, 4A and 4B outlines certain signal processing operations that determine distance-indicating coordinates (DIC) with subpixel resolution based on valid wavelength peaks produced in wavelength-dispersed intensity profiles from the CRS system and determine measurement distances to surfaces (e.g., in microns) based on the determined DICs. Certain previously known operations outlined here are described in more detail in the '456 patent, while certain alternative operations as disclosed herein are described in more detail below with respect to FIGS. 5-12. The purpose of this description is to provide information which is useful for an overall understanding of certain CRS measurement operations as described herein.

FIG. 3 is a diagram 300 of a wavelength-dispersed intensity profile from a CRS system illustrating a valid wavelength peak 302 produced by a subset of measurement profile signals MS(p) indicative of a wavelength focused on and reflected by a surface (e.g., of a calibration object or a workpiece, etc.) As previously noted, as part of the standard operations for CRS systems, the signal level will be greatest for the wavelength corresponding to the surface height or distance to the surface, for which the wavelength that is well-focused on the surface will generally form the highest peak in the overall detector signal. In the example of FIG. 3, the diagram 300 includes a wavelength peak 302 corresponding to a measured surface. Each of the measurement profile signals MS(p) has the signal level (shown in normalized volts) associated with each pixel p of the detector array (e.g., the detector array 163). The wavelength peak 302 has more than sufficient height (a good signal to noise ratio), is relatively symmetric, and allows a good estimation of the peak location or measurement distance-indicating coordinate (DIC) 304 along the wavelength measurement axis of the detector array. FIG. 3 also shows a bias signal level MVbias (in normalized volts), a peak pixel coordinate (ppc), and a data threshold MVthreshold that defines the lower limit of a distance-indicating subset of measurement profile signals MS(p) forming the wavelength peak 302. All values (e.g., including "MV" values) are in normalized volts.

Briefly, in one embodiment, measurement operations for determining a distance-indicating coordinate (DIC) (in pixels) and determining a corresponding measurement distance (in microns) based on the determined DIC may include the following:

Position the target surface along the optical axis OA, and capture the resulting wavelength-dispersed intensity profile as in the diagram 300.
Determine the peak pixel coordinate (ppc), which is the pixel that has the highest signal.
Determine the measurement bias signal level MVbias at a given sampling rate.
Determine the data threshold MVthreshold (e.g., as a percentage of the peak height).
Determine the distance-indicating coordinate (DIC) with sub-pixel resolution, based on the distance-indicating subset of measurement profile signals MS(p) forming the wavelength peak that has a value greater than MVthreshold.
Determine the measurement distance by correlating the DIC with a corresponding distance in the stored distance calibration data (e.g., a distance calibration curve as in FIG. 4A or FIG. 11, or a lookup table as in FIG. 4B, etc.).

In the foregoing operations, a DIC may be determined with sub-pixel resolution, based on the distance-indicating subset of measurement profile signals MS(p) above the data threshold MVthreshold. In accordance with previously known methods, a DIC may be determined as the subpixel-resolution coordinate of a centroid $X_C$ of the distance-indicating subset of signals MS(p). For example, for a detector with 1024 pixels (i.e., each having a corresponding pixel number (p) from 1 to 1024), the centroid $X_C$ may be determined according to:

$$Xc = \frac{\sum_{p=1}^{1024} p(S_M(p))^n}{\sum_{p=1}^{1024} (S_M(p))^n} \tag{Eq. 1}$$

where, $$S_M(p) = \begin{cases} MS_p - MVThreshold(ppc), & \text{for } MS_p \geq MVThreshold(ppc) \\ 0, & \text{for } MS_p < MVTThreshold(ppc) \end{cases} \tag{Eq. 2}$$

In one specific example, n=2 in EQUATION 1. It will be appreciated that EQUATION 2 restricts the signals MS(p) used in the centroid calculation to a distance-indicating subset.

FIG. 4A is a diagram 400A of a first representation of CRS measurement distance calibration data 410A which correlates distance-indicating coordinates (DIC) with sub-pixel resolution to known measurement distances (ZOUT) in microns along the optical axis (OA) of the CRS system (e.g., as stored in the calibration portion 169 of FIG. 1). It will be appreciated that the specific values of FIG. 4A are intended to be illustrative only, and may not correspond to specific values indicated in other examples (e.g. in relation to certain values described with respect to FIGS. 1-3 and/or the specific table values of FIG. 4B as will be described in more detail below, although it will be appreciated that the concepts are analogous). The example shown in FIG. 4A is for an optical element (e.g., optical pen) having a nominal total measurement range MR of approximately 300 microns, which corresponds to DICs in the range of approximately 150 pixels-490 pixels. However, the CRS system may be calibrated over a larger pixel range and/or different portion of the detector array 163, if desired. Although the distance calibration data 410A appears to form a smooth curve, it will be appreciated that in some instances the distance calibration data and/or output spectral profile data for a typical CRS system, particularly for economical CRS systems, may exhibit certain short range variations/irregularities (e.g., as described in part in the '456 patent).

One exemplary laboratory calibration method (e.g., as may be utilized for factory calibration, etc.) to determine the CRS measurement distance calibration data 410A and/or 410B employs a mirror (e.g., which in one example implementation may be the surface 190 of FIG. 1) moved along the optical axis OA. The displacement of the mirror along the optical axis OA relative to the optical pen may be controlled (e.g., by a stepper motor, etc.) which steps the calibration measurement distance in approximately equal steps (e.g., 0.1 or 0.2 micron steps). For each step, the actual mirror position or displacement is acquired using a reference standard, such as an interferometer. For each actual mirror position, the calibration distance indicating coordinate of the CRS system is determined, based on the corresponding intensity profile data provided by the CRS detector. The calibration distance indicating coordinate and the corresponding actual position are then recorded to provide the distance calibration data 410A and/or 410B. While such techniques may be utilized to provide accurate distance calibration data (e.g., as part of a factory calibration process), certain alternative techniques as disclosed herein (e.g., as will be described in more detail below with respect to FIGS. 7-12) may also or alternatively be utilized in certain implementations, for which such alternative techniques may have certain advantages.

After the distance calibration data has been determined, during later measurement operations, to determine a measurement distance to a workpiece surface (e.g. surface 190 of FIG. 1), the workpiece surface is positioned along the optical axis OA of the CRS optical pen. The measurement distance indicating coordinate of the CRS is determined, based on the measurement DIC determined from the intensity profile data provided by the CRS detector. Then, the distance calibration data (e.g., such as distance calibration data 410A, 410B, or 1110) is used to determine the CRS measurement distance Z that corresponds to that specific measurement DIC.

FIG. 4B is a diagram 400B of a second representation of CRS distance calibration data 410B comprising a CRS distance calibration lookup table for referencing distance-indicating coordinates to measurement distances for a chromatic point sensor (e.g., as stored in the calibration portion 169 of FIG. 1). As noted above, it will be appreciated that the table values of FIG. 4B are intended to be illustrative only, and may not correspond to specific values indicated in other examples, such as those of FIG. 4A, although for which it will be appreciated that the concepts are analogous. In general, it will be appreciated that a same set of distance calibration data may be represented as both a curve (e.g., as illustrated in FIGS. 4A and 11) or a table (e.g., as illustrated in FIG. 4B) and that the distance calibration data utilized to form one such type of representation may similarly be utilized to form the other type of representation and/or other representations.

In FIG. 4B, in the left column the calibration DICs entries cover the pixel coordinates from 1 to 1,024, in increments of 0.1 pixel steps, and in the right column the corresponding measurement distances (in microns) (ZOUT) are entered. In operation, the measurement DIC calculated by the CRS system is referenced to the stored calibration lookup table in order to determine the corresponding measurement distance (in microns). If the measurement DIC falls between adjacent calibration DIC values, then the measurement distance may be determined, for example, by interpolation. In the example of FIG. 4B, some specific example values are shown for some small ranges near DICs with pixel positions of approximately 104, 604 and 990, with corresponding measurement distances in ranges near 37 microns, 381 microns and 486 microns.

In operation (e.g., for a measurement distance to a surface 190 as illustrated in FIG. 1), the optical pen 120 is connected to the CRS electronics portion 160 and operably positioned relative to the surface 190 to perform measurement operations. The measurement operations include the optical pen 120 inputting an input spectral profile from the illumination source 164 and outputting corresponding radiation to the surface 190 and receiving reflected radiation from the surface 190 and outputting the reflected radiation to provide an output spectral profile to the CRS wavelength detector 162, which then provides output spectral profile data. The output spectral profile includes a distance-dependent profile component and a distance-independent profile component. The distance-dependent profile component has a wavelength peak (e.g., peak 302 in FIG. 3) that indicates a measurement distance (e.g., measurement distance Z) from the optical pen 120 to the surface 190. As described above, the measurement DIC that is determined in accordance with a centroid calculation by the CRS system is referenced to the stored distance calibration data (e.g., FIG. 4A, 4B, or 11) in order to determine the measurement distance (e.g., measurement distance Z which is a value ZOUT) corresponding to the measurement DIC. If the measurement DIC falls between adjacent calibration DIC values, then the measurement distance corresponding to the measurement DIC may be determined by interpolation (e.g., between the measurement distances corresponding to the adjacent calibration DIC values).

Figure 5:
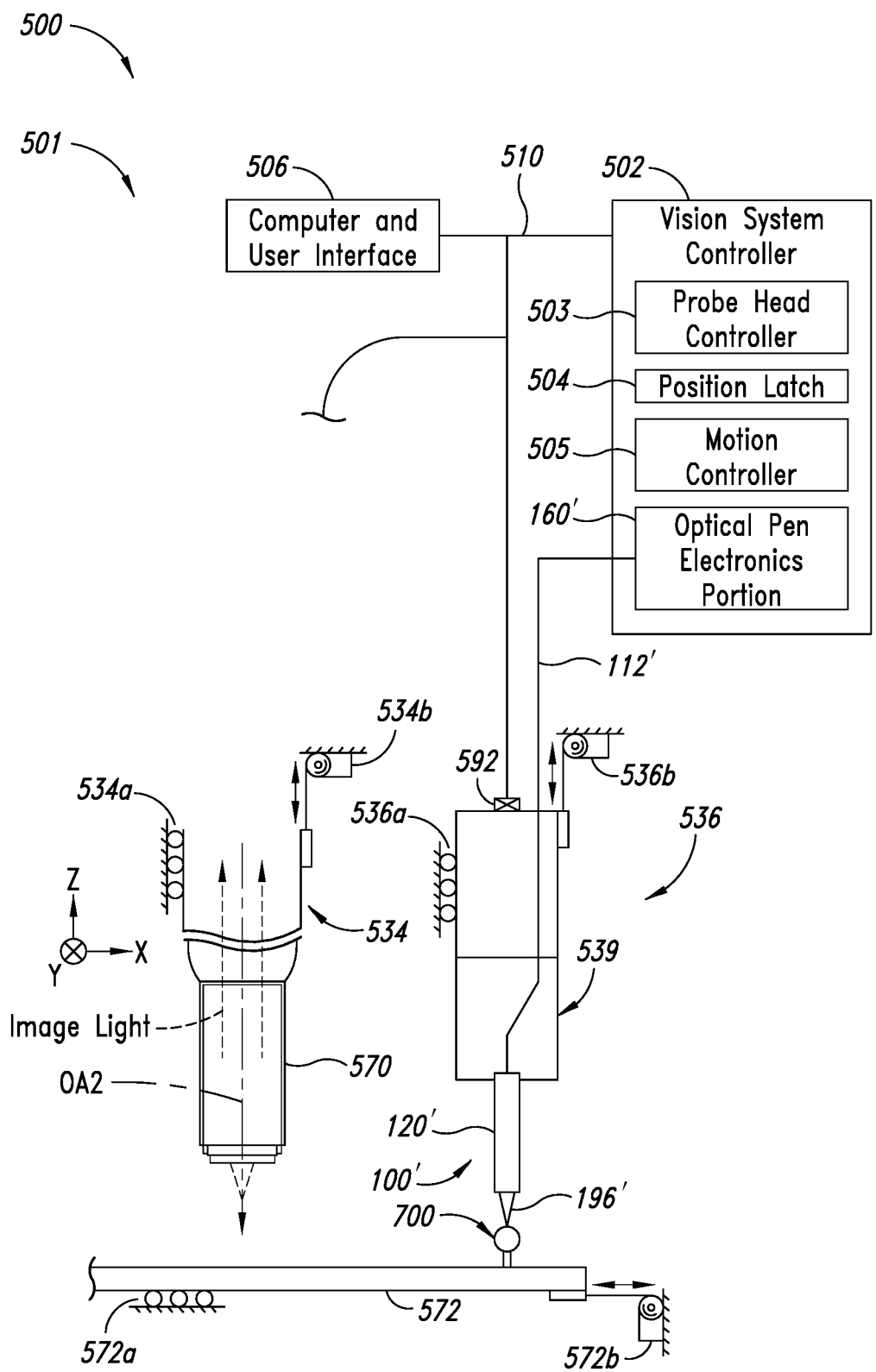
FIG. 5 is a block diagram of a first exemplary implementation of a measuring system including a measuring machine (e.g., a machine vision inspection system) utilized in conjunction with a CRS system for measuring a workpiece.

FIG. 5 is a block diagram of a first exemplary implementation of a measuring system 500 including a measuring machine 501 (e.g., a machine vision inspection system) utilized in conjunction with a CRS system 100' for measuring a workpiece. In various drawings herein, unless otherwise indicated by description or context, reference numbers having similar suffixes (e.g. reference number 1XX and 1XX' or 5XX having the suffix XX) may refer to generally analogous elements, such that operation of element 1XX' or 5XX may be generally understood by one of ordinary skill in the art with limited description, based on analogy to a previous description of analogous element 1XX, and so on. However, it will be understood that despite such analogy, various elements may have different implementations in different embodiments, as will be apparent to one of ordinary skill in the art, and are not limited to being identical.

As is known in the art, machine vision inspection systems ("vision systems") can be utilized to obtain precise dimensional measurements of inspected objects and to inspect various other object characteristics. Such systems may include a computer and user interface 506, a camera (not shown), an optical imaging system 534, and a precision stage 572 that is movable, such that the camera is enabled to scan the features of a workpiece that is being inspected. Machine vision inspection systems with optical systems such as the optical imaging system 534 are described in U.S. Pat. Nos. 7,454,053 and 8,085,295, which are hereby incorporated herein by reference in their entireties. Various aspects of machine vision inspection systems and control systems are also described in more detail in U.S. Pat. No. 7,324,682 (the '682 patent) and in U.S. Patent Pub. No. 20050031191 (the '191 publication), which are also hereby incorporated herein by reference in their entireties. As described in the '682 patent and the '191 publication, the machine vision inspection system (MVIS) 501 may include a vision system controller 502 which is usable to recall captured and stored workpiece inspection images, to inspect and analyze workpiece features in such workpiece inspection images, and to store and/or output the inspection results. FIG. 5 includes orthogonal XYZ coordinate axes, as a frame of reference, for a machine coordinate system (MCS), for the MVIS 501. In the configuration of FIG. 5, the Z axis of the MCS is parallel to the Z direction of the optical pen 120', which is defined to be parallel to the optical axis of the optical pen 120', which is the distance measurement axis of the optical pen 120'.

As illustrated in FIG. 5, the optical imaging system 534 including an objective lens 570 has an optical axis OA2 and may be utilized to magnify and image a surface of a workpiece on the stage 572. The optical imaging system 534 may attain an image focus by moving along Z axis guide bearings 534a, and in various implementations may be moved by a motion mechanism 534b (e.g., a controllable motor that drives an actuator to move the optical imaging system 534 along the Z axis). In various implementations, the motion mechanism 534b may be controlled by a motion controller 505 in the vision system controller 502. In various implementations, a workpiece may be located in the field of view (FOV) of the optical imaging system 534 on the workpiece stage 572, which is movable along X and Y axes on guide bearings 572a. The workpiece stage 572 may be moved by a motion mechanism 572b (e.g., a controllable motor that drives an actuator to move the workpiece stage 572 along the X and/or Y axes). In various implementations, the motion mechanism 572b may be controlled by the motion controller 505.

The machine vision inspection system (MVIS) 501 may include a probe system 536, which may be mounted to or otherwise coupled to a turret of the MVIS 501 (forming the optical imaging system 534) via suitable bracket means (not shown). The probe system 536 may be adapted to hold an optical pen 120' of the CRS system 100', to be used in conjunction with various measurement and calibration functions, such as those described herein. In various implementations, the optical pen 120' will be understood to include similar or identical components as the optical pen 120 of FIG. 1. The optical pen 120' may be mechanically coupled to a probe head assembly 539, and an optical fiber 112' connects the optical pen 120' to the optical pen electronics portion 160' of the CRS system 100'. In the illustrated embodiment, the optical pen electronics portion 160' is part of the vision system controller 502. The MVIS 501 may include associated control software, approximately comparable to those available with the QUICK VISION® QV Apex series of vision systems available from Mitutoyo America Corporation (MAC), located in Aurora, IL.

In this configuration, standard coordinate measuring machine techniques may be utilized in conjunction with standard machine vision techniques to utilize the motion controller 505 to control the movement of the probe system 536 and/or workpiece stage 572 to automatically position the optical pen 120' with the measurement beam 196' in relation to a surface to be measured. Additionally or alternatively, the motion controller 505 may be utilized to move the workpiece stage 572 and/or the optical imaging system 534, so that measurement and calibration functions (e.g., such as those described herein and in the incorporated references, etc.) may be performed. As will be described in more detail below, certain operations may be performed as part of a calibration method for obtaining distance calibration data for the CRS system 100' including the optical pen 120', including measuring a spherical calibration object 700 (e.g., see FIG. 7).

As illustrated in FIG. 5, the probe system 536 is movable along Z axis guide bearings 536a, and may be moved by the motion mechanism 536b (e.g., a controllable motor that drives an actuator to move the probe system 536 along the Z axis). In various implementations, the motion mechanism 536b may be controlled by the motion controller 505. In various implementations, the probe system 536 may be coupled to the optical imaging system 534 (e.g., coupled to a turret that contains the optical imaging system 534 via suitable bracket means), such that one or both of the Z axis guide bearings 534a and/or 536a may be included and/or otherwise utilized for enabling the Z axis motion of the optical imaging system 534 and the probe system 536 as controlled by one or both of the motion mechanisms 534b or 536b. In some implementations, the turret of the MVIS 501 and the optical pen 120' of the CRS system 100' move along the Z axis direction in tandem. In various implementations, the Z measurement ranges of the optical imaging system 534 and the optical pen 120' may be calibrated or referenced to one another and to the MVIS 501's Z axis controller coordinates. The optical pen electronics portion 160' and the vision system controller 502 may be configured to exchange data and control signals according to known methods to support coordinated adjustment (e.g., mechanical movement) of the optical pen 120' and the optical imaging system 534.

FIG. 5 illustrates blocks representing exemplary control circuits and/or routines. The blocks include the computer and user interface 506, the vision system controller 502, which may act as a host system for communicating with the optical pen electronics portion 160' and which includes a probe head controller 503, a position latch 504, and the motion controller 505. All of the blocks are interconnected to each other and to various components of the machine vision and inspection system 501 by a power and control bus 510, which is connected to the probe system 536 through a connection 592 in the embodiment in FIG. 5. The optical pen electronics portion 160' may perform measurements using the optical pen 120', and exchange control and data signals with the computer and user interface 506 and/or the vision system controller 502.

The motion controller 505 of the MVIS 501 may be utilized for controlling a motion mechanism (e.g., motion mechanism 536b) for adjusting the distance between the optical pen 120' and a surface to be measured (e.g., of a workpiece or calibration object, etc.), to correspond to a distance at which a surface to be measured is within the measurement range R of the optical pen 120'. As noted above, in various implementations, a surface to be measured may also be positioned in X and Y axis directions relative to the optical pen 120' (e.g., by movement of the probe system 536 and/or workpiece stage 572, which is movable along X and/or Y axes on the guide bearings 572a as moved by the motion mechanism 572b as may be controlled by the motion controller 505). In particular, as will be described in more detail below, in various implementations distance calibration data may be obtained (e.g., while performing a spiral scan of an upper surface of a spherical calibration object 700), for which relative movement may be made in X and Y axis directions (e.g., utilizing the motion mechanism 572b, etc.). In some implementations, as part of such processes, the Z position of the optical pen 120' (e.g., in a machine coordinate system) may remain constant (e.g., for which the motion mechanism 536b, which may also be referenced as a Z motion mechanism, may not be utilized to move the optical pen 120' while the spiral scan is performed for obtaining distance calibration data).

In various implementations, a measuring machine (e.g., an MVIS) may include alternative configurations for achieving relative movement along the X and/or Y axis directions. For example, rather than the stage 572 being movable in both the X and Y axis directions, the stage 572 may be movable in only one direction (e.g., the X axis direction, as moved by a motion mechanism 572b), while the probe system 536 may be movable in the other direction (e.g., the Y axis direction, as moved by a corresponding motion mechanism). In other implementations, the stage 572 may be fixed, with the probe system 536 being movable in both X and Y axis directions (e.g., as moved by a corresponding motion mechanism). In various implementations, the measuring system 500 including the measuring machine (MVIS) 501 of FIG. 5 may include highly accurate motion mechanisms, such that the relative X and Y axis movements of the optical pen 120' relative to the spherical calibration object 700 may have an accuracy of better than 1 micron, such that the X and Y coordinates for the positions of each measured surface point in the distance indicating data obtained from a spiral scan will have a high degree of accuracy.

In various implementations, the position latch 504 provides a latch signal. In one embodiment, the position latch 504 of the vision system controller 502 helps ensure that the XYZ coordinates (e.g., MCS coordinates) of the probe system 536 with the optical pen 120' (e.g., as controlled by the motion controller 505) are properly synchronized with the measurements from the optical pen 120'. For example, a latch signal may be generated by the position latch 504 as corresponding to a point in time when a CRS measurement is taken, for which the latch signal also causes the XYZ coordinates of the probe system 536 in the machine coordinate system to be determined/recorded/latched from the same point in time. Thus, the CRS measurement (e.g., indicating a Z distance) of the optical pen 120' may be combined with the XYZ coordinates of the probe system 536 (i.e., indicating the XYZ position of the probe system 536 and optical pen 120' when the measurement was taken) in order to determine the overall position data/measurement within the machine coordinate system. As will be described in more detail below, as part of certain calibration operations, a Z position of the probe system 536 may be kept constant, for which the position latch may primarily be in relation to the XY coordinates of the probe system 536 and correspondingly the optical pen 120', which are combined with the CRS measurement (e.g., indicating a Z distance) of the optical pen 120' to the corresponding surface point (i.e., at the corresponding XY coordinates) on the spherical calibration object 700.

In general, the various blocks outlined above may be configured using components and operations that are similar or identical to those used for similar operations in certain previously known systems. It will be appreciated that in various embodiments, the operations of the blocks outlined above may be carried out using general purpose processors or the like, and that in various embodiments the circuits and/or routines associated with various blocks may be merged or indistinguishable. Operations for utilizing the optical pen 120' for scanning the spherical calibration object 700 for obtaining distance calibration data for the CRS system 100' (e.g., such as distance calibration data 400A, 400B or 1100) will be described in more detail below.

Figure 6:
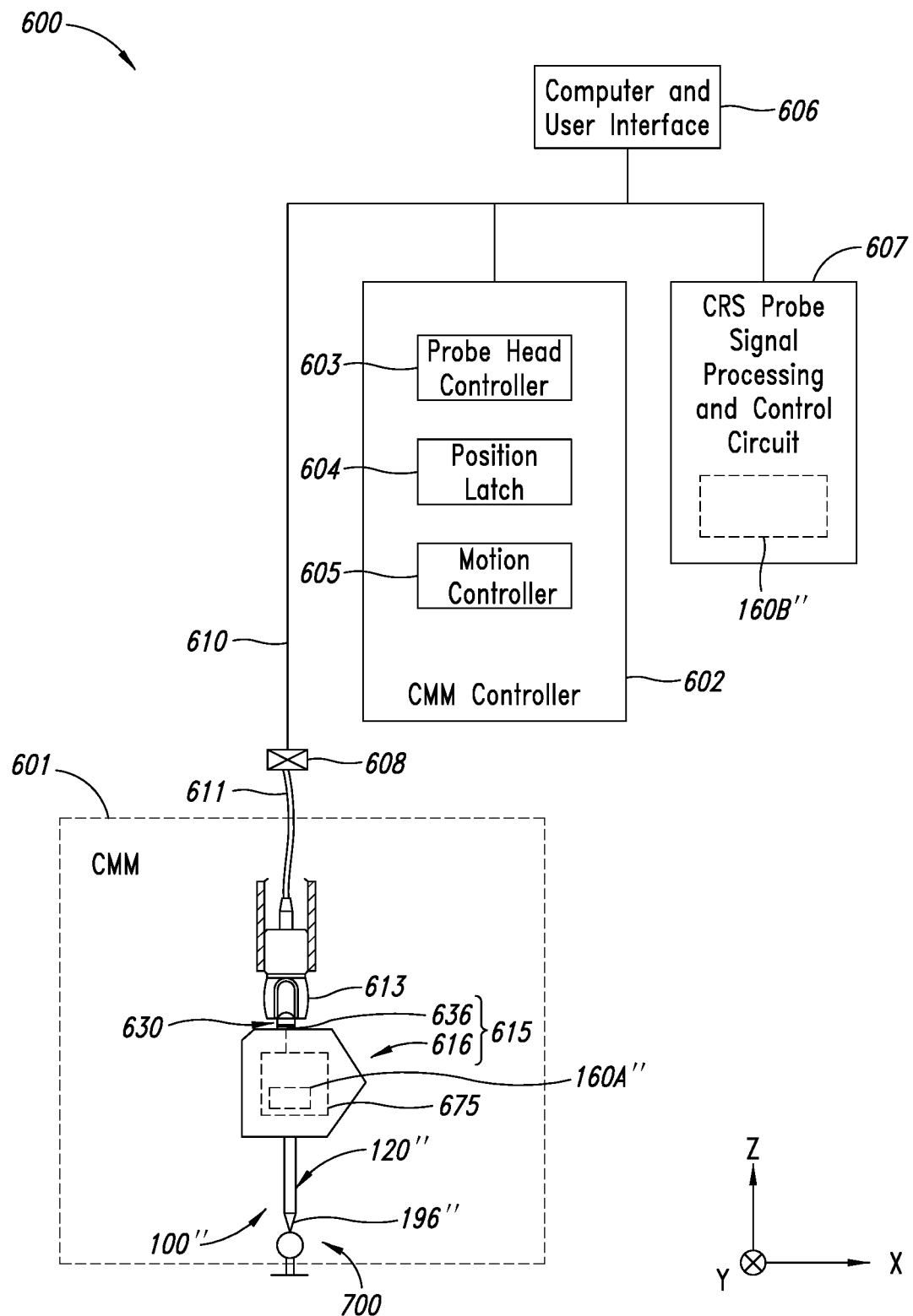
FIG. 6 is a block diagram of a second exemplary implementation of a measuring system including a measuring machine (e.g., a coordinate measuring machine) utilized in conjunction with a CRS system for measuring a workpiece.

FIG. 6 is a block diagram of a second exemplary implementation of a measuring system 600 including a measuring machine 601 (e.g., a coordinate measuring machine (CMM)) utilized in conjunction with a CRS system 100" for measuring a workpiece. In the example of FIG. 6, certain portions of the CRS system 100" are included as part of an interchangeable CRS optical probe system 615. That is, the CRS optical probe system 615 may be automatically interchanged with other types of CMM probes. A CRS optical probe system may also be referred to simply as a CRS optical probe herein. FIG. 6 includes orthogonal XYZ coordinate axes, as a frame of reference, for a machine coordinate system (MCS), for the CMM 601. In the configuration illustrated in FIG. 6, the Z axis of the MCS is parallel to the Z direction of the optical pen 120", which is defined to be parallel to the optical axis of the optical pen 120", which is the distance measurement axis of the optical pen 120".

The measuring system 600 includes a coordinate measuring machine controller 602, a computer and user interface 606, a probe signal processing and control circuit 607, and the coordinate measuring machine 601. The controller 602 includes a probe head controller 603, a position latch 604 and a motion controller 605. The CRS optical probe 615 includes an auto exchange joint element 636 and is connected to the coordinate measuring machine 601 through a mating joint element in the probe autojoint connection 630 (also referred to as an auto exchange joint connection).

In various implementations, the coordinate measuring machine 601 may communicate with all of the other components through a data transfer line 610 (e.g. a bus), which is connected by a connector 608 (e.g. a "micro-D" type connector) to a probe head cable 611 which provides signals to and from the CRS optical probe 615. The coordinate measuring machine 601 is controlled by the coordinate measuring machine controller 602, while the CRS optical probe 615 exchanges data with, and is controlled by, the probe signal processing and control circuit 607 (e.g. in one implementation including measurement signal processing and control elements 160B", as outlined above with reference to the element 160B in FIG. 1). In various implementations, the user may control some or all of the components through the computer and user interface 606.

The CRS optical probe 615 includes a probe electronics 675 which includes a light source and wavelength detector portion 160A" (e.g. in one embodiment, including a light source and wavelength detector as outlined above with reference to the element 160A in FIG. 1), and an optical pen 120", which directs a measurement beam 196" toward a measurement surface. In various implementations, data related to the optical pen 120" (e.g. identification data, distance calibration data, compensation data, etc.) may be stored externally to the CRS optical probe 615 (e.g. in the probe signal processing and control circuit 607.) In alternative implementations, portions of such data may be stored or otherwise encoded within portions of the CRS optical probe 615.

The CRS optical probe 615 includes the optical pen 120" of the CRS system 100", to be used in conjunction with various measurement functions. In this configuration, standard coordinate measuring machine techniques may be utilized in conjunction with the motion controller 605 to automatically position the CRS optical probe 615 with the optical pen 120" with the measurement beam 196" in relation to a workpiece, so that measurement functions (e.g., such as those described in the incorporated references, etc.) may be performed. As will be described in more detail below, certain similar operations may be performed as part of a calibration method for obtaining distance calibration data for the CRS system 100" including the optical pen 120", including measuring a spherical calibration object 700 (e.g., see FIG. 7).

In various implementations, the position latch 604 provides a latch signal. In one embodiment, the position latch 604 of the coordinate measurement machine controller 602 helps ensure that the XYZ coordinates of the coordinate measurement machine 601 (e.g., as controlled by the motion controller 605) are properly synchronized with the measurements from the optical pen 120". For example, a latch signal may be generated by the position latch 604 as corresponding to a point in time when a CRS measurement is taken, for which the latch signal also causes the coordinates of the CMM 601 (e.g., in the machine coordinate system) to be determined/recorded/latched from the same point in time. Thus, the CRS optical probe measurement (e.g., indicating a Z distance) may be combined with the XYZ coordinates of the CMM (i.e., indicating the position of the CRS optical probe 615 and optical pen 120" in the MCS when the measurement was taken) in order to determine the overall position data/measurement within the MCS.

In general, the various blocks outlined above may be configured using components and operations that are similar or identical to those used for similar operations in certain previously known systems. It will be appreciated that in various embodiments, the operations of the blocks outlined above may be carried out using general purpose processors or the like, and that in various embodiments the circuits and/or routines associated with various blocks may be merged or indistinguishable. Operations for utilizing the optical pen 120" for scanning the spherical calibration object 700 for obtaining distance calibration data for the CRS system 100" (e.g., such as distance calibration data 400A, 400B or 1100) will be described in more detail below.

Figure 7:
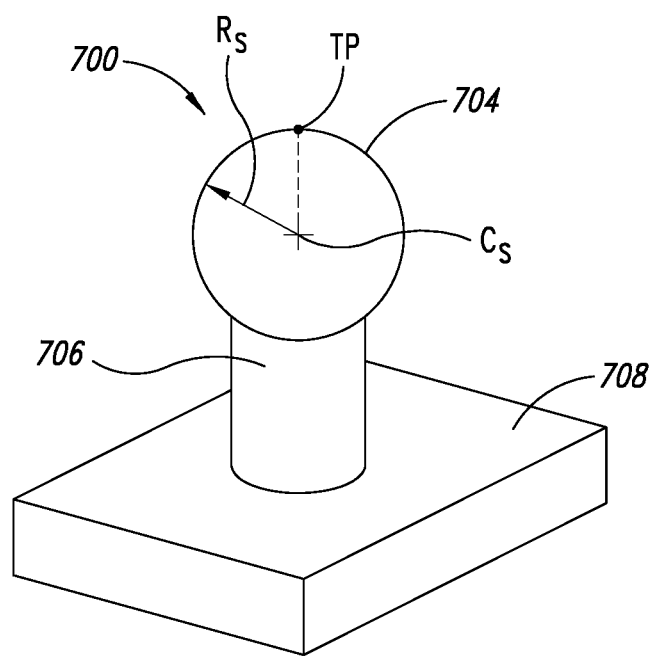
FIG. 7 illustrates an embodiment of a calibration object in the form of a spherical calibration object.

FIG. 7 illustrates an embodiment of a spherical calibration object 700 for use in obtaining distance calibration data for a CRS system 100 with an optical pen 120 (e.g., as attached to a measuring machine such as illustrated in FIGS. 5 and 6). The spherical calibration object 700 comprises a nominally spherical calibration surface 704 with a top point TP (e.g., a highest point along a Z axis) and may typically be supported by a support structure 706 above a surface plate 708 (e.g., as may be part of, or positioned on, the surface plate 708). The spherical calibration object 700 has a nominal radius $R_S$ and a reference center $C_S$. As will be described in more detail below, measurements taken of the spherical calibration object 700 may be utilized to determine distance calibration data for a CRS system 100.

Figure 8:
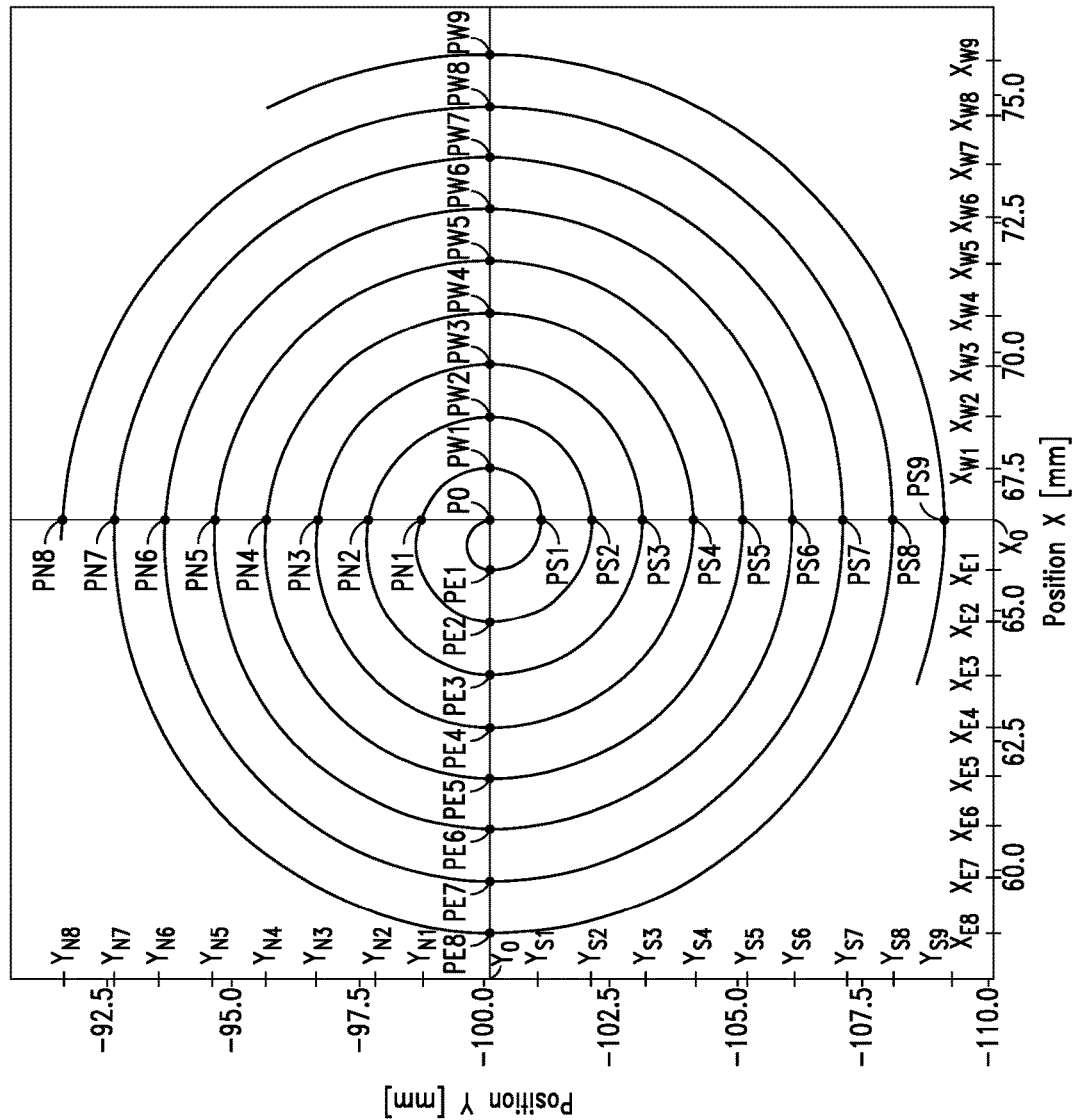
FIG. 8 illustrates a spiral scan as performed on a top surface of a spherical calibration object.

FIG. 8 illustrates a spiral scan 800 as performed on a top portion of a nominally spherical calibration surface 704 of a spherical calibration object 700. The illustration of FIG. 8 is a top view illustrating a two dimensional representation of the spiral scan that is performed in three dimensions over the top portion of the spherical calibration object 700. The X axis and Y axis positions are in accordance with the machine coordinate system of the measuring machine that is utilized for moving the optical pen 120 (e.g., the machine vision inspection system 501 of FIG. 5, or the coordinate measuring machine 601 of FIG. 6, etc.). The spiral scan pattern of FIG. 8 illustrates the motion (e.g., in X and Y axis directions) of the optical pen 120 and measurement beam 196 over the top surface of the spherical calibration object 700 (e.g., while the optical pen 120 is maintained at a constant Z-height along the Z axis).

In various implementations, a number of surface points may be measured as part of a spiral scan, for determining distance indicating data which corresponds to a distance between the chromatic range sensor optical pen 120 and each respective surface point on the nominally spherical calibration surface of the spherical calibration object 700. In the example of FIG. 8, a number of example surface points are illustrated (e.g., surface points P0, PE1-PE8, PS1-PS9, PW1-PW9, PN1-PN8), although it will be appreciated that in various implementations additional surface points may be acquired along the spiral scan pattern (e.g., in addition and/or alternatively to the example surface points illustrated in FIG. 8). For example, in some implementations the number of surface points measured may be in the hundreds or thousands. As one example, if average Z axis direction steps of approximately 10 microns are desired, and if the measurement range R of an optical pen 120 is approximately 100 microns, such may correspond to measuring approximately 10 surface points (i.e., equal to 100/10) over the 100 micron range for determining the desired distance calibration data. As another example, if average Z axis direction steps of approximately 1.0 microns are desired, and if the measurement range R of an optical pen 120 is approximately 100 microns, such may correspond to measuring approximately 100 surface points (i.e., equal to 100/1) over the 100 micron range for determining the desired distance calibration data (e.g., which may correspond to higher accuracy than the 10 micron step example). As another example, if average Z axis direction steps of approximately 0.3 microns are desired, with a measurement range R for the optical pen 120 of approximately 300 microns, such may correspond to measuring approximately 1,000 surface points (i.e., equal to 300/0.3) over the 300 micron range for determining the desired distance calibration data.

In various implementations, it may be desirable to increase the frequency of the surface points that are measured as part of the spiral scan as the spiral scan progresses further from the center. In particular, it is noted that the change in Z distance between surface points may occur more rapidly the further the spiral scan is from the center (i.e., due to the increasing slope of the spherical calibration object 700 further from the top point TP). Correspondingly, if it is desired to have approximately equal Z-height steps between the subsequently measured surface points, then it may be desirable to correspondingly measure surface points more frequently along the spiral scan the further the spiral scan progresses from the center point P0 (e.g., at intervals between the measured surface points that result in approximately equal Z-height steps between each of the surface points).

Figure 9A:
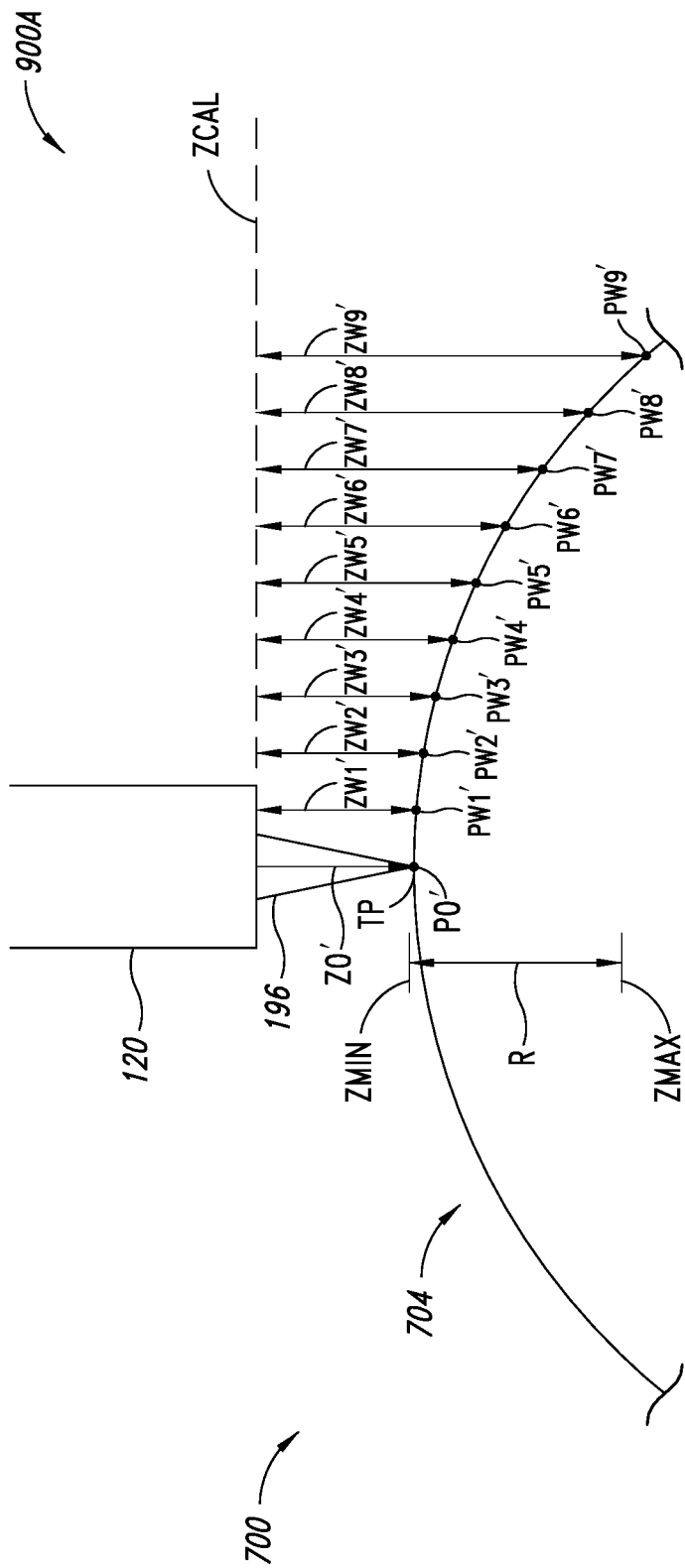
FIG. 9A illustrates example measurements of distances to surface points on a spherical calibration object, for which a center point of a spiral scan is precisely aligned with a top center of the spherical calibration object.
Figure 9B:
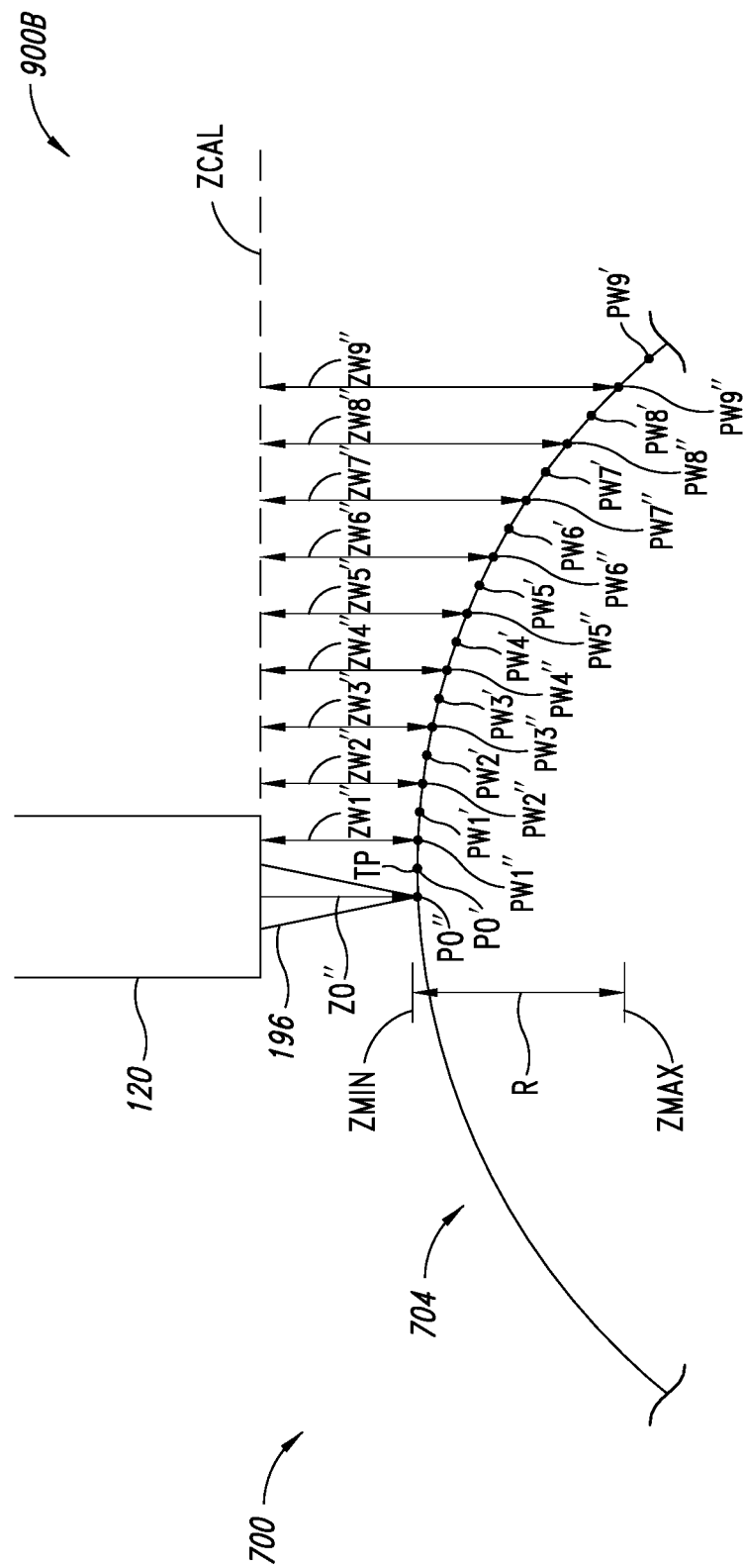
FIG. 9B illustrates example measurements of distances to surface points on a spherical calibration object, for which a center point of a spiral scan has an offset relative to a top center of the spherical calibration object.

In the example of FIG. 8, each of the example surface points have corresponding X and Y axis coordinates. At the center of the spiral scan pattern is a center point P0, at coordinates X0, Y0. Extending to the right are example surface points PW1-PW9 with surface point PW1 at coordinates XW1, Y0, surface point PW2 at coordinates XW2, Y0, etc. Extending to the left are surface points PE1-PE8, with surface point PE1 at coordinates XE1, Y0, surface point PE2 at coordinates XE2, Y0, etc. Extending down are surface points PS1-PS9 with surface point PS1 at coordinates X0, YS1, surface point PS2 at coordinates X0, YS2, etc. Extending up are surface points PN1-PN8, with surface point PN1 at coordinates X0, YN1, surface point PN2 at coordinates X0, YN2, etc. For the particular set of example surface points illustrated in FIG. 8, for simplification of the illustration, the example surface points PW1-PW9 and PE1-PE8 are noted to have a same Y axis coordinate Y0 (e.g., for which a line extending through the example surface points in the two dimensional representation is parallel to the X axis). The surface points PN1-PN8 and PS1-PS9 are noted to have a same X axis coordinate X0 (e.g., for which a line extending through the example surface points in the two dimensional representation is parallel with the Y axis). It will be appreciated that in a three dimensional representation and/or different side views (e.g., as illustrated in FIGS. 9A and 9B), lines through the example surface points may be curved (e.g., in accordance with the shape of the top portion of the spherical calibration object 700).

It will be appreciated that for the particular example surface points of FIG. 8, as the spiral scan progresses around the spiral pattern, the example surface points occur at different angular orientations (e.g., of approximately 90 degree intervals for the example surface points in FIG. 8). For example, from the surface point PE1, at respective rotations of approximately 90 degrees each along the spiral pattern, is the surface point PS1, followed by the surface point PW1, the surface point PN1, the surface point PE2, the surface point PS2, etc. It will be appreciated that in accordance with the geometric characteristics of the spiral pattern, the X, Y coordinates for each respective surface point along the spiral pattern may be at a respective further radial distance from the X, Y coordinates of the center point P0. For example, a radial distance of PW1 (e.g., corresponding to XW1-X0) may be greater than a radial distance of PS1 (e.g., corresponding to Y0-YS1), which may be greater than a radial distance of PE1 (e.g., corresponding to X0-XE1). It will be appreciated that such calculations of radial distances may generally be in accordance with an absolute value of the distance between the respective coordinates of the respective points. As will be described in more detail below, in an example such as FIG. 9A where a top point TP is at a same location as a center point P0', the radial distances from surface points to the top point TP are the same as radial distances to the center point P0'. In contrast, in an example such as FIG. 9B, when a center point P0" is not at a same location as a top point TP, the radial distances to the top point TP will be different than the radial distances to the center point P0".

In regard to the example of FIG. 8, it may be noted that the outer portions of the spiral scan include partial spiral scan portions, such as the portion that includes the surface points PS9 and PW9. It will be appreciated that such a partial spiral scan portion may result from a top point TP of a spherical calibration object not being perfectly aligned with the center point P0 of the spiral scan. More specifically, the scanned surface points in FIG. 8 correspond to points that are within the measurement range R of the optical pen 120. Thus, when outer portions of the spiral scan reach points on the spherical calibration object that are out of the range R of the optical pen 120, no surface points are shown as having been measured in the spiral scan (i.e., due to such surface points being out of the range R). Thus, the discontinuous portion of the spiral scan including the points PS9 and PW9 may be indicative that the top point TP of the spherical calibration object may be at a different location than the center point P0 of the spiral scan (e.g., such as being located approximately between the surface points PW1 and PS1, or otherwise offset from the center point P0, such as in the southwest direction, in the illustrated example.)

As will be described in more detail below, in an example such as FIG. 9A, as part of the spiral scan measurements of each surface point, each further radial distance may generally correspond to a further measurement distance from the optical pen 120 along the Z axis. As noted above, while for simplicity of the illustration only a relatively few surface points are illustrated in FIG. 8, in various implementations a greater number of surface points (e.g., 100s or 1000s of surface points) may be measured as part of a spiral scan for determining the distance calibration data. As will be described in more detail below, FIG. 9A illustrates an example where a center point P0' of a spiral scan is at a same position as a top point TP of a spherical calibration object 700, while FIG. 9B illustrates an example where a center point P0" of a spiral scan is offset from a top point TP of a spherical calibration object 700.

FIG. 9A is a cross sectional side view illustrating certain example surface points P0'-PW9' that are measured as part of a spiral scan (e.g., such as that of FIG. 8) of a top portion of a nominally spherical calibration surface 704 of a spherical calibration object 700. In the example of FIG. 9A, only surface points P0'-PW9' are illustrated for simplicity, although it will be appreciated that additional surface points (e.g., surface points PE1'-PE8') could similarly be illustrated on the left side of such an example. In FIG. 9A, the optical pen 120 is illustrated as being maintained at a constant Z position/height in the machine coordinate system during the spiral scan process, for which the constant Z position/height may be referenced as a Z-height ZCAL. Each of the distances Z0'-ZW9' between the optical pen 120 and the respective surface points P0'-PW9' are correspondingly illustrated as being between the surface points P0'-PW9' and the calibration Z-height ZCAL. As described above, the optical pen 120 has a measurement beam 196 that is directed at each respective surface point when each respective surface point is being measured (i.e., for which a distance between the optical pen 120 and the respective surface point is being measured).

As illustrated in FIG. 9A, the measurement range R of the optical pen spans between a minimum measurement distance ZMIN and a maximum measurement distance ZMAX. To begin the spiral scan, the optical pen 120 is arranged relative to the spherical calibration object 700 so that the minimum measurement distance ZMIN is near/proximate to the top point TP of the nominally spherical calibration surface 704. In various implementations, the minimum measurement distance ZMIN may be slightly above or below the top point TP. In one implementation, the minimum measurement distance ZMIN may be just above the top point TP, to help ensure that the desired surface points, such as surface points P0'-PW9' for determining the desired distance calibration data, will all be within the measurement range R of the optical pen 120. In another implementation, the minimum measurement distance ZMIN may be just below the top point TP, to help ensure that the entire measurement range R of the optical pen 120 corresponds to surface points on the nominally spherical calibration surface 704 of the spherical calibration object 700. In such an implementation, the top point TP may not fall within the measurement range R of the optical pen 120 (e.g., as being just above the measurement range R), but for which the location of the top point TP may still be determined or otherwise indicated (e.g., based on the distance indicating data from the spiral scan and the known characteristics of the nominally spherical calibration surface 704), as will be described in more detail below.

The particular example of FIG. 9A is useful for describing certain relationships that may occur when the center point P0' of the spiral scan exactly corresponds to the top point TP of the spherical calibration object 700. It will be appreciated that while a general/rough location of the top point TP may be known (e.g., as may enable such positioning), that a precise location of the top point TP may in some instances generally be unknown (e.g., in terms of exact X, Y coordinates) for which such precise location may be determined through further processes (e.g., based on the distance indicating data from the spiral scan), as will be described in more detail below with respect to the example of FIG. 9B.

In accordance with the general characteristics of a spiral scan such as that of FIG. 8, each respective point in the spiral pattern will respectively be further from the center point P0'. Correspondingly, in the example of FIG. 9A, since the center point P0' corresponds to (i.e., has the same X, Y coordinates as) the top point TP, each of the respective surface points along the spiral scan will have a radial distance in X, Y coordinates that is further from the X, Y coordinates of the top point. Correspondingly, in accordance with the geometric properties of the nominally spherical calibration surface 704, each of the subsequent distances ZW1'-ZW9' will be greater than the previous corresponding Z distance. As a result, each of the corresponding wavelength peaks 302 (e.g., see FIG. 3) corresponding to the measurements of the subsequent measurement points P0'-PW9' will be shifted to the right on the wavelength measurement axis (e.g., such as that illustrated in FIG. 3), for which the corresponding distance indicating coordinate for each will have a higher value.

Such relationships are illustrated in the curve 1010' of FIG. 10, for which each of the points P0'-PW9' is shown to have a corresponding distance indicating coordinate that increases and corresponds to an increased radial position (i.e., for which increased radial positions correspond to increased Z distances, in accordance with the geometric shape of the nominally spherical calibration surface 704). In FIG. 10, the curve 1010' includes the data for the surface points P0'-PW9' of FIG. 9A, while a curve 1010" includes the data for the surface points P0"-PW9" of FIG. 9B, as will be described in more detail below. In the example of FIG. 10, the curve 1010" is overlaid on the curve 1010', for which the two curves are very similar or identical. In the curve 1010' of FIG. 10, the radial position indicates a distance of the X, Y coordinates of the respective surface point from the X, Y coordinates of the top point TP. Thus, it will be appreciated that in various implementations, the X, Y position of the top point TP (e.g., as determined or otherwise known) is related to (e.g., and may be utilized for determining) the radial position of each surface point. As will be described in more detail with respect to FIG. 9B, in an example where a center point P0" has an offset from the top point TP, a fitting process and/or other calculations may be utilized to determine and/or properly fit the measurements of the surface points to a curve 1010" such as that of FIG. 10.

With respect to the example of FIGS. 9A and 10, it will be appreciated that in relation to the example points along the spiral scan in FIG. 8, respective additional points would fall between the illustrated points in FIG. 10. More specifically, along the curve 1010', between the surface points P0' and PW1', would be the surface points PE1' and PS1', respectively. Similarly, between the surface points PW1' and PW2' would be the surface points PN1', PE2' and PS2', respectively and so on, for which all of the subsequent surface points would continue to be in order along the curve 1010' that is illustrated in FIG. 10. As noted above, in various implementations numerous other surface points may be measured in addition or alternatively to the few example surface points illustrated in FIG. 8. In this regard, in the example of FIG. 9A where there is perfect alignment between the center point P0' and the top point TP, each subsequent surface point that is measured along the spiral scan will be located further along the curve 1010' of FIG. 10, as corresponding to a further radial position relative to the top point TP, and also a subsequently a higher/larger distance indicating coordinate. Again, such properties are a result of the geometric properties of the nominally spherical calibration surface 704 of the calibration object 700, for which each subsequent surface point further along the spiral scan and thus further from the top point TP will have a greater corresponding Z distance from the optical pen 120 that is maintained at the constant Z-height ZCAL during the spiral scan.

As noted for FIG. 9A, the radial positions of each of the measured surface points in relation to the top point TP can be utilized to determine exact Z-heights/positions of each measured surface point (i.e., based on known curve/geometric properties of the nominally spherical calibration surface 704). As will be described in more detail below, for the spiral scan of FIG. 9B, the radial positions of the measured surface points (i.e., relative to the top point TP) are not yet known because the exact location of the top point TP is unknown (i.e., does not coincide exactly with the center point P0" of the spiral scan in FIG. 9B). However, due to the known properties/characteristics of both the spiral scan (e.g., for which the X, Y positions of each of the measured surface points are known) and the nominally spherical calibration surface 704, the distance indicating data acquired during the spiral scan (e.g., including the known X, Y location of each measured surface point and the corresponding distance indicating coordinate that is determined from the measurement of each surface point), can be utilized to determine/deduce the X, Y location of the top point TP and/or the corresponding radial positions of each of the measured surface points (e.g., relative to the top point TP).

In one implementation, the X, Y location of the top point TP and/or the corresponding radial positions of each of the measured surface points may be determined by performing a process including minimizing a fit error for a curve (i.e., a curve of the distance indicating data) in the XY direction (e.g., including performing iterations with trying different locations of the top point TP until a fit error is minimized). In other implementations, various other types of calculations may alternatively or also be utilized for determining the X, Y location of the top point TP and/or the corresponding radial positions of each of the measured surface points. As some specific simplified example values in relation to such calculations and/or curve fitting techniques, it is noted that in relation to FIG. 9B, the measurements of the surface points P0" and PW1" result in identical distance indicating coordinates. In such a case, it can be deduced that the top point TP is equidistant from the surface points P0" and PW1" (i.e., based on the known properties/characteristics of the nominally spherical calibration surface 704). Furthermore, if the X, Y coordinates of the top point TP lie on a line between the X, Y coordinates of the surface points P0" and PW1", then the radial positions/distances to the other surface points (e.g., surface point PW2") should correspond/be consistent with certain values (i.e., the distance indicating coordinate for the measured surface point PW2" should correspond to a Z-height/position that is consistent with a radial distance to the top point TP if the top point TP is at the assumed location between the surface points P0" and PW1").

In contrast, if the top point TP was not on the line between the surface points P0" and PW1", but was still equidistant from the two surface points, then a different location of the top point TP could be determined (e.g., utilizing iterations at different experimental locations that are each equidistant from the surface points P0" and PW1") to determine a location of the top point TP that is consistent with the distance indicating coordinates determined for the other surface points (e.g., surface point PW2", etc.) While such example values in relation to FIG. 9B are provided for simplicity of the explanation, it will be appreciated that other known types of similar calculations and/or curve fitting (e.g., minimizing a fit error for a curve) techniques may be utilized for determining the location of the top point TP and/or radial positions of the measured surface points based on the distance indicating data that is acquired during the spiral scan, given the known properties/characteristics of the spiral scan and the nominally spherical calibration surface 704.

In the example of FIG. 9B, as noted above the center point P0" of the spiral scan has an offset from a top point TP of a nominally spherical calibration surface 704 of a spherical calibration object 700, and for which surface points P0"-PW9" of the spiral scan are illustrated. Other than this difference, certain characteristics of FIG. 9B will be understood to be similar to the characteristics of FIG. 9A, and for which the surface points P0'-PW9' of FIG. 9A are illustrated for comparison in the diagram of FIG. 9B. In the example of FIG. 9B, as noted above the surface points P0" and PW1" are approximately equidistant from the top point TP, and for which in this example the top point TP may be considered to be located exactly between (e.g., equidistant from) the surface points P0" and PW1". In this regard, it will be appreciated that the Z distances ZO" and ZW1" are approximately equal (i.e., due to the points P0" and PW1" being at equal distances on opposite sides of the top point TP). Thus, in the curve 1010" of FIG. 10, the points P0" and PW1" are indicated as corresponding to a same distance indicating coordinate when measured by the optical pen 120, and correspondingly each are at a same radial position/distance (i.e., in X, Y coordinates of the machine coordinate system) relative to the X, Y coordinates of the top point TP.

In relation to the example of FIG. 9B, it will be appreciated that in accordance with curve fitting or other techniques such as those noted above, a correct plotting of the measured surface points along a curve 1010" such as that of FIG. 10, may require a correct fitting to such a curve (e.g., requiring a correct determination of the radial position/distance for each surface point). For example, in further regard to the examples noted above, if the point P0" were attempted to be plotted at the same location as the point P0' (i.e., under an incorrect assumption that the point P0" was at the location of the top point TP), and the surface point PW1" was plotted at the same location as the surface point PW1', an incorrect curve (i.e., with errors relative to expected values) would result (e.g., as may be observed/determined based on not fitting/being consistent with the known properties of the nominally spherical calibration surface 704). In particular, a plotting of the points P0" and PW1" at different locations along a curve, would not be consistent with known properties for which the different distance indicating coordinates should correspond to different radial positions (e.g., for which differences relative to such known properties may be regarded as errors that should be minimized as part of a curve fitting process, etc.) More specifically, the measurements of the surface points P0" and PW1" produce a same distance indicating coordinate (i.e., due to equal distances ZO" and ZW1"), which should correspond to a same radial position of each of the surface points P0" and PW1" relative to the top point TP. By performing a process to correctly determine the radial positions of each of the surface points P0"-PW9" relative to the top point TP (e.g., so as to correspond to known properties, etc.), a correctly fit curve may result (i.e., for which a fit error is minimized), as illustrated as the example curve 1010" of FIG. 10.

In certain implementations, such curve fitting or similar calculations and/or techniques may effectively correspond to performing iterations for which the X, Y coordinates of the top point TP are tried at different locations, and for which the different corresponding radial positions/distances of the surface points are determined/plotted. Such iterations may be continued until a resulting curve and/or corresponding radial positions/distances fit expected values/has a minimized fit error for the curve (e.g., as also effectively having determined X, Y coordinates of the top point TP). By correctly determining the radial positions of each of the surface points P0"-PW9" relative to the top point TP, the distance calibration data that corresponds to each of the surface points P0"-PW9" can also correctly be determined. It is noted that the plotted curve 1010" is essentially identical to the plotted curve 1010', thus illustrating that the spiral scan of FIG. 9B, even with the offset of the center point P0" relative to the top point TP, produces accurate distance calibration data (e.g., such as corresponding to the conversion of either the curve 1010' or 1010" to the curve 1110 of FIG. 11, as will be described in more detail below).

FIG. 11 is a diagram 1100 of a representation of CRS distance calibration data 1110 in the form of a distance calibration data curve, similar to that of FIG. 4A, which correlates distance-indicating coordinates with measurement distances to a surface. The conversion of the curve 1010' or 1010" of FIG. 10 to the curve 1110 of FIG. 11, requires a conversion of the radial positions of FIG. 10 to Z positions/distances of FIG. 11. In various implementations, such conversions may be done in accordance with known geometric characteristics/principles, for which a given radial distance from the top point TP along the nominally spherical calibration surface 704, will result in a known corresponding Z position/distance for each surface point (e.g., in accordance with the known geometric and trigonometric relationships and characteristics, etc.)

FIG. 11 is noted to convey similar information as the calibration curve 410A of FIG. 4A, and may be utilized similarly to FIG. 4A as described above. In various implementations, when distance calibration data such as that illustrated by FIG. 11 is determined in accordance with principles as disclosed herein, such determined distance calibration data may be utilized for various purposes. For example, for an optical pen that has not previously had distance calibration data determined, or for which existing distance calibration data is to be replaced, the distance calibration data illustrated by FIG. 11 may be stored in the calibration portion 169 of the memory portion 168 of the electronics portion 160. Alternatively, in an implementation where distance calibration data such as that of FIG. 11 is utilized to perform an accuracy check on the stored distance calibration data of an optical pen, a comparison may be made between the distance calibration data of FIG. 11 and the previously stored distance calibration data, to determine if there are significant differences. In various implementations, if significant differences are found, a warning may be provided to a user that indicates that the stored distance calibration data may have inaccuracies, for which further action may be needed (e.g., such as further testing/verification and/or sending the optical pen 120 back to a factory or other facility for a full factory calibration to be performed, etc.)

With respect to the general nature of the spherical calibration object 700, it is expected to have a highly accurate nominally spherical calibration surface 704. It is noted that the spherical calibration object 700 may have a nominally spherical calibration surface 704, but may not be a full sphere (e.g., may be a hemisphere or less of a portion of a sphere, which provides a nominally spherical calibration surface 704 that can be utilized in accordance with principles disclosed herein, such as illustrated in FIGS. 9A and 9B). Because of the highly accurate nature of the surface 704 of the spherical calibration object 700, each increasing radial distance from the top point TP will correspond to a longer distance Z between the optical pen 120 and the corresponding surface point on the spherical calibration object. In this regard, the determination of the exact location of the top point TP enables the distance indicating data obtained from the spiral scan to be accurately associated with correct Z distances/positions, as illustrated in FIG. 11.

As a quick example with respect to FIG. 9B, as shown in FIG. 10, if the points P0" and PW1" were instead plotted at the radial positions of point P0' and PW1', respectively, (e.g., due to an inaccurate assumption that the top point TP in FIG. 9B was located at the surface point P0"), the indicated radial positions of the points P0" and PW1" would be inaccurate, for which the radial positions are utilized to correspond to Z positions/distances in the graph of FIG. 11 for the calibration data. Instead, with respect to the example of FIG. 9B, by correctly determining that the location of the top point TP is as shown in FIG. 10 (as determined in accordance with the correct fitting of the curve (e.g., minimizing the fit error for the curve in the XY direction) of the distance indicating data obtained from the spiral scan to the expected curve characteristics, the surface points P0" and PW1" can be correctly associated with an identical radial position, for which the corresponding distance indicating coordinate of FIG. 11 can be correctly associated with the correct Z position/distance (e.g., as determined from the radial position of FIG. 10). As noted previously, given the highly accurate surface 704 of the spherical calibration object 700, each radial position corresponds to an exact Z position/distance, in accordance with trigonometric principles as each measured surface point is determined to be at a respective distance from the top point TP.

Figure 12:
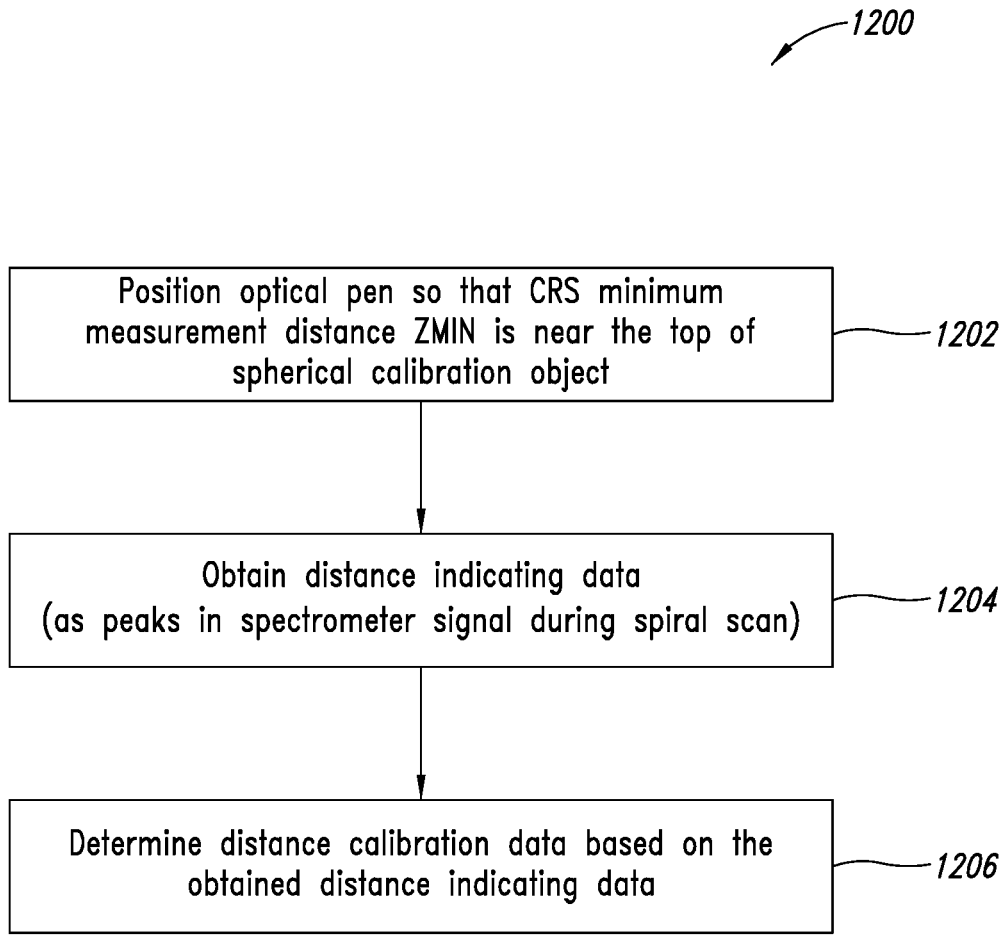
FIG. 12 is a flow diagram illustrating one exemplary embodiment of a routine for determining distance calibration data for a CRS system.

FIG. 12 is a flow diagram illustrating one exemplary embodiment of a routine 1200 for determining distance calibration data for a chromatic range sensor system by taking measurements of surface points of a spherical calibration object. The routine 1200 may be employed, for example, by one or more of the embodiments of a chromatic range sensor system described herein. For convenience, the routine 1200 is described with reference to FIGS. 8 to 11. The chromatic range sensor system has a chromatic range sensor optical pen 120 that is coupled to a measuring machine with a machine coordinate system. The chromatic range sensor optical pen 120 is configured to focus different wavelengths at different distances along a distance measurement axis proximate to a workpiece surface to be measured.

The routine 1200 begins at 1202, where the chromatic range sensor optical pen 120 is arranged in a relationship relative to a spherical calibration object 700 that has a nominally spherical calibration surface 704. For example, the chromatic range sensor optical pen 120 may be positioned so the CRS minimum measurement distance ZMIN is near a top point TP of the nominally spherical calibration surface 704 of the spherical calibration object 700. The routine 1200 proceeds from 1202 to 1204.

At 1204, the routine 1200 controls the measuring machine to achieve relative movement of the chromatic range sensor optical pen 120 with respect to the nominally spherical calibration surface 704 to obtain distance indicating data. In some embodiments, a constant Z-height (e.g., maintaining a same Z-coordinate) of the chromatic range sensor optical pen 120 in the machine coordinate system above the nominally spherical calibration surface 704 may be maintained as the distance indicating data is obtained.

A spiral scan, such as described above with reference to FIGS. 8 to 9B, may have advantages as compared to other possible scanning patterns for obtaining distance indicating data. In particular with regard to utilization of a spherical calibration object, it may be desirable to start the scan at or near the top point TP of the spherical calibration object (e.g., for which a spiral scan beginning at a center position P0 is particularly suited for beginning at or near a top point TP), to help insure that the spiral scan will cover a valid portion of the range R of the optical pen, such as illustrated in FIGS. 9A and 9B. More specifically, in an example where the optical pen 120 has not yet been calibrated and does not yet have distance indicating calibration data, it may be uncertain where the minimum and maximum distances ZMIN and ZMAX will be located relative to the optical pen 120. For example, if a scan pattern was started at a location off to a side of the spherical calibration object, such may correspond to a distance beyond the distance ZMAX, outside of the valid range R of the optical pen, for which no valid measurement points may be obtained for the initial portion of the scan. In contrast, by performing a spiral scan with the center position P0 located at or near the top point TP of the spherical calibration object, it may increase the probability that the spiral scan will cover at least a majority of the valid measurement range R of the optical pen 120 for measuring surface points on the spherical calibration object.

Thus, the relative movement of the chromatic range sensor optical pen 120 may be in a spiral pattern as referenced in an X-Y plane (e.g., an X-Y plane that is at or parallel to an X-Y plane at a calibration Z-height ZCAL), so as to perform a spiral scan of a top portion of the nominally spherical calibration surface 704 for which distance indicating data is determined as corresponding to the distances between the chromatic range sensor optical pen 120 and surface points on the nominally spherical calibration surface 704 as the spiral scan is performed. Distance indicating data may be obtained as described above with respect to FIGS. 8 to 9B, which indicates Z distances as corresponding to peak locations. As discussed above, the surface points for which the distance indicating data is determined may number in the hundreds or thousands, and may comprise, for example at least 100 surface points. The routine 1200 proceeds from 1204 to 1206.

At 1206, the routine 1200 determines distance calibration data for the chromatic range sensor system based on the obtained distance indicating data. As part of such a process, a relative position of each surface point in relation to a top point of the nominally spherical calibration surface may be determined.

In some embodiments, the distance indicating data collected during the spiral scan may be evaluated to determine a location of the top point of the nominally spherical calibration surface 704 and the relative position of each surface point. For example, minimizing a fit error for a curve (e.g., of the distance indicating data from the spiral scan) in the XY direction may be employed to determine the top point, as described in more detail with respect to FIGS. 9B and 10 above. For example, a fitting routine may be performed minimizing a fit error for the curve in the XY direction, which may converge on the determination of the top point location of the spherical calibration object 700, such as based on when the distance indicating data obtained from the spiral scan best fits an expected curve (e.g., in particular as described above with respect to FIG. 10.) As noted above, such fitting routines may be performed by iteration, for which different assumed top point locations are tried relative to the distance indicating data obtained from the spiral scan, until a best fit curve is achieved. It will be appreciated that other techniques may also or alternatively be employed for making such determinations. For example, in some implementations certain calculations may be performed for more quickly determining the top point location (e.g., calculations based on the principle that if two surface points such as P0″ and PW1″ correspond to identical distance indicating coordinates as in the example of FIG. 9B, such may indicate that the two surface points are at equal radial positions from the top point TP, for which trigonometric principles or other analysis may be utilized for determining the location of the top point TP).

In some embodiments, a known or stored location of a top point TP of the nominally spherical calibration surface 704 may be utilized instead of or in addition to a determined location of the top point of the nominally spherical calibration surface 704. For example, the spherical calibration object 700 may be fixed on the stage of the measuring machine, for which the top point TP of the spherical calibration object may have an XY location that is already previously known without requiring an evaluation of the data from the spiral scan. In various implementations, the spherical calibration object 700 of FIG. 7 may be placed by a user (e.g., on a stage of a measuring machine) for utilization in accordance with principles disclosed herein (e.g., for performing a spiral scan for determining distance calibration data).

In various implementations, the surface points on the nominally spherical calibration surface are each at a same nominal radius from a common interior center point of the spherical calibration object. The top point of the nominally spherical calibration surface may be directly above the common center point and correspondingly may have the same X axis and Y axis coordinates as the common center point in the machine coordinate system. The nominal radius and the known or determined position of the top point above the common center point may be employed to determine the distance calibration data. The relative position of each surface point in relation to the top point corresponds to a radial position of each surface point, for which each radial position corresponds to a known difference between the Z axis coordinates of the top point and the surface point in the machine coordinate system, in accordance with the known geometric properties of the nominally spherical calibration surface. This known information may be used together with the obtained distance indicating data to generate/determine the distance calibration data.

For example, in various implementations the known difference between the Z axis coordinates corresponds to at least part of a measurement distance from the optical pen to the surface point. For each surface point, the distance indicating data comprises a distance indicating coordinate that is determined for the surface point based on a wavelength peak that results along the wavelength measurement axis of the detector array 163 of the wavelength detector 162 from the measurement of the surface point. The determining of the distance calibration data may include correlating the distance indicating coordinate for each surface point with a distance corresponding to the measurement distance from the optical pen to the surface point. The distance calibration data may take the form of a calibration curve, such as the curve illustrated in FIG. 11.

Embodiments of a routine for determining distance calibration data for a chromatic range sensor system by taking measurements of surface points of a spherical calibration object may perform additional acts not shown in FIG. 12, may perform fewer acts than shown in FIG. 12, may combine or separate acts shown in FIG. 12, and may perform acts in various orders.

For example, the routine 1200 may include an act of storing or uploading the distance calibration data. For example, the distance calibration data may be uploaded to the calibration portion 169 of the electronics portion 160 of the CRS system as illustrated in FIG. 1. The stored or uploaded distance calibration data may be utilized during a subsequent measurement of a surface point. A distance indicating coordinate for the surface point may be determined based on a wavelength peak that results along the wavelength measurement axis of the detector array from the measurement of the surface point, with the stored distance calibration data utilized to determine a measurement distance (e.g., from the optical pen to the measured surface point) based on a measurement distance that is correlated with the determined distance indicating coordinate by the stored distance calibration data.

In some embodiments, intensity peak data may be utilized in addition to the distance indicating data. For each measurement distance in the working range of the optical pen (e.g., as described with respect to FIGS. 3-4B), there may actually be a different total amount of light received by the optical pen 120 as part of its normal operations. More specifically, with reference to FIG. 3, the top of the wavelength peak 302 is shown to be at a level 0.93, due to the amount of light that is received for a surface point being measured at that distance. In comparison, as the optical pen is moved closer or further away from the surface, and the wavelength peak 302 moves to the left or right along the wavelength measurement axis that is illustrated in FIG. 3, the signal level (amount of illumination) for the different peaks may be higher or lower, depending on the amount of light that is actually received, for which the variances are part of the normal operations of the optical pen 120 and the light source, etc. (e.g., for which the light source may have a different amount of power that is provided for different light colors/light wavelengths along the range, etc.). Such signal level differences may affect the centroid calculations, etc., for determining the distance indicating coordinates, for which it may be desirable to compensate for such differences. In some implementations, it may be desirable to have two calibration data curves, such as FIG. 4A for distance calibration data for indicating distance indicating coordinates versus Z-height measurements, and a second curve for indicating how much illumination (e.g., signal level in FIG. 3) results at each measurement distance.

For example, prior to or after performing a scan (e.g., a spiral scan), in various implementations the relative position of the optical pen 120 may be moved up and/or down (e.g., along the Z axis direction) relative to the spherical calibration object 700, such that only the distance Z from the optical pen 120 to the spherical calibration object 700 is changed. For example, with references to FIGS. 9A and 9B, a sweep may be performed (e.g., with the measurement beam 196 directed at position P0) through a range of Z distances and intensity peak data as generated during the sweep. An intensity versus peak pixel curve may be determined based on the intensity peak data. More specifically, with reference to FIG. 3, as the optical pen 120 is moved to different distances from the spherical calibration object 700, for each distance Z, the peak pixel coordinate (PPC) will be at a different location on the wavelength measurement axis, and for which the intensity (the signal level) is recorded for each peak pixel coordinate location. Such intensity peak data may be utilized for intensity normalization (e.g., as illustrated in FIG. 3 for which the signal level is indicated to be in normalized volts).

Alternatively, in some implementations intensity peak data may be gathered or approximated during the process of gathering the distance indicating data. For example, data from a spiral scan may be employed to determine an approximation of an intensity normalization curve. More specifically, similar to the process described above where the optical pen is kept in the same XY position and moved up or down in the Z direction to obtain different intensity normalization calibration data points, the heights of the peaks determined during the spiral scan will generally each correspond to a different distance Z between the optical pen 120 and the respective surface point on the spherical calibration object 700, for which the intensity (signal level) for each Z-height and corresponding peak pixel coordinate may be recorded as part of an intensity normalization curve.

After such intensity peak data is collected (e.g., before, after, or during the spiral scan process), intensity calibration may be applied to the collected peaks from the spiral scan, before the distance indicating coordinates are determined. In certain implementations, an intensity normalization calibration curve may not be collected. It is noted that the collection of the intensity normalization curve and its application to normalize the intensity (signal level) values in the measurement profile signals may in certain implementations result in more accurate distance calibration data and/or subsequent corresponding measurements.

In various implementations, the calibration process as disclosed may be performed periodically (e.g., for determining new or updated calibration data for the CRS system, or for verifying the accuracy of the current calibration data stored in the CRS system, etc.). In various implementations, the calibration data determined from the calibration process may be stored in the calibration portion 169 of the CRS system 100 (e.g., as new calibration data, and/or to replace existing calibration data). If a difference is determined between the determined calibration data and existing calibration data, a warning/recommendation, etc. may be provided to a user (e.g., indicating that there may be an issue with the current stored calibration data, for which the new calibration data may be utilized, or the CRS system 100 may be returned to a factory or other facility for factory calibration, or other corrective process may be performed, etc.).

As described above, a method is provided for providing distance calibration data for a chromatic range sensor system with a chromatic range sensor optical pen that is coupled to a measuring machine. The chromatic range sensor optical pen is configured to focus different wavelengths at different distances proximate to a surface to be measured. The chromatic range sensor optical pen is arranged in a relationship relative to a spherical calibration object that has a nominally spherical calibration surface. The measuring machine is controlled to achieve relative movement of the chromatic range sensor optical pen in relation to the nominally spherical calibration surface. The relative movement of the chromatic range sensor optical pen is in a spiral pattern so as to perform a spiral scan of a portion of the nominally spherical calibration surface for which distance indicating data is determined as corresponding to distances between the chromatic range sensor optical pen and surface points on the nominally spherical calibration surface as the spiral scan is performed. Distance calibration data for the chromatic range sensor system is determined based on the distance indicating data.

In some implementations, the determining of the distance calibration data includes determining a relative position of each surface point in relation to a top point of the nominally spherical calibration surface. The determining of the distance calibration data may include utilizing the distance indicating data collected during the spiral scan to determine a location of the top point of the nominally spherical calibration surface and the relative position of each surface point. In some implementations, the surface points on the nominally spherical calibration surface are each at a same nominal radius from a common interior center point of the spherical calibration object, and for which the top point of the nominally spherical calibration surface is directly above the common center point and correspondingly has the same X axis and Y axis coordinates as the common center point in a machine coordinate system of the measuring machine (e.g., as illustrated and described with respect to the examples of FIGS. 7, 9A and 9B, etc.)

In some implementations, the relative position of each surface point in relation to the top point corresponds to a radial position of each surface point. Each radial position may correspond to a known difference between the Z axis coordinates of the top point and the surface point in a machine coordinate system of the measuring machine in accordance with the known geometric properties of the nominally spherical calibration surface.

In some implementations, the known difference between the Z axis coordinates corresponds to at least part of a measurement distance from the chromatic range sensor optical pen to the surface point. For each surface point, the distance indicating data includes a distance indicating coordinate that is determined for the surface point based on a wavelength peak that results along a wavelength measurement axis from the measurement of the surface point. The determining of the distance calibration data includes correlating the distance indicating coordinate for each surface point with the measurement distance from the chromatic range sensor optical pen to the surface point.

In some implementations, the distance calibration data is stored. As part of a subsequent measurement of a surface point, a distance indicating coordinate is determined for the surface point based on a wavelength peak that results along the wavelength measurement axis from the measurement of the surface point. The stored distance calibration data is utilized to determine a measurement distance from the chromatic range sensor optical pen to the measured surface point based on a measurement distance that is correlated with the determined distance indicating coordinate by the stored distance calibration data.

In some implementations, the wavelength measurement axis is an axis of a detector array of a wavelength detector of the chromatic range sensor system.

In some implementations, the chromatic range sensor optical pen has a measurement range extending between a minimum measurement distance and a maximum measurement distance. The arranging the chromatic range sensor optical pen in the relationship relative to the spherical calibration object includes positioning the chromatic range sensor optical pen so that the minimum measurement distance is proximate to the top point of the nominally spherical calibration surface of the spherical calibration object.

In some implementations, for the performance of the spiral scan, the surface points for which the distance indicating data is determined include at least 100 surface points. In some implementations, the measuring machine is controlled during performance of the spiral scan to achieve relative movement of the chromatic range sensor optical pen in relation to the nominally spherical calibration surface while maintaining a constant Z-height of the chromatic range sensor optical pen in a machine coordinate system of the measuring machine.

In some implementations, the method includes determining intensity peak data as corresponding to an amount of light received by the chromatic range sensor optical pen for different distances between the chromatic range sensor optical pen and the nominally spherical calibration surface. Intensity calibration data is determined based on the intensity peak data, wherein the distance indicating data may be determined based at least in part on the intensity calibration data.

In some implementations, the determining intensity peak data includes achieving relative movement of the chromatic range sensor optical pen for performing a sweep through a range of Z axis distances from the nominally spherical calibration surface while maintaining unchanged X axis and Y axis coordinates in a machine coordinate system of the measuring machine, and capturing intensity peak data during the sweep. Determining the intensity calibration data includes generating an intensity normalization calibration curve based on the captured intensity peak data.

In some implementations, the determining intensity peak data includes capturing intensity peak data during the spiral scan. Determining intensity calibration data includes generating an intensity normalization calibration curve based on the captured intensity peak data.

In some implementations, a system is provided which includes a measuring machine, a chromatic range sensor system and a spherical calibration object. The measuring machine includes a motion controller. The system is configured to utilize the motion controller to achieve relative movement of the chromatic range sensor optical pen in relation to the nominally spherical calibration surface. A spiral scan of the nominally spherical calibration surface is performed for determining distance indicating data which is utilized to determine distance calibration data.

In some implementations, the determining of the distance calibration data includes determining a radial position of each surface point relative to the location of a top point of the nominally spherical calibration surface, for which each radial position corresponds to a distance between the corresponding surface point and the chromatic range sensor optical pen when the measurement was taken in accordance with the geometric properties of the nominally spherical calibration surface. Each distance is associated with the distance indicating coordinate that is determined for the corresponding surface point as part of the determination of the distance calibration data.

In some implementations, the system is further configured to store the distance calibration data, and to subsequently perform a measurement process for determining a measurement distance which corresponds to a distance between the chromatic range sensor optical pen and a surface point on a surface. The measurement process includes determining a distance indicating coordinate for the surface point based on a wavelength peak that results along a wavelength measurement axis from the measurement of the surface point. The stored distance calibration data is utilized to correlate the distance indicating coordinate with the corresponding measurement distance.

In some implementations, the distance indicating data that corresponds to the distances between the chromatic range sensor optical pen and each surface point comprises a distance indicating coordinate that is determined for each surface point based on a wavelength peak that results along a wavelength measurement axis from the measurement of the surface point.

In some implementations, the chromatic range sensor system includes a chromatic range sensor optical pen, an illumination source, a wavelength detector, and a processing portion. The illumination source is configured to generate multi-wavelength input light having an input spectral profile that is input to the chromatic range sensor optical pen. The wavelength detector includes a plurality of pixels with respective pixel positions distributed along a wavelength measurement axis of the wavelength detector. The chromatic range sensor system is configured such that, when the chromatic range sensor optical pen is operably positioned relative to a surface to perform measurement operations, the chromatic range sensor optical pen inputs the input spectral profile and outputs corresponding radiation to the surface and receives reflected radiation from the surface and outputs the reflected radiation to the wavelength detector. The processing portion configured to determine distance indicating data resulting from relative movement of the chromatic range sensor optical pen in relation to the nominally spherical calibration surface. The relative movement of the chromatic range sensor optical pen is in a spiral pattern so as to perform a spiral scan of a portion of the nominally spherical calibration surface, from which the distance indicating data is determined as corresponding to distances between the chromatic range sensor optical pen and surface points on the nominally spherical calibration surface as the spiral scan is performed. The distance calibration data is determined based on the distance indicating data.

In some implementations, the distance calibration data correlates distance-indicating coordinates with measurement distances. In some implementations, determining of the distance calibration data includes determining a location of a top point of the nominally spherical calibration surface based at least in part on the distance indicating data obtained from the spiral scan.

In some implementations, the distance calibration data includes distance-indicating coordinates along the wavelength measurement axis of the wavelength detector which are correlated with Z axis measurement distances along a Z axis to a measured surface, for which the Z axis corresponds to an optical axis of the chromatic range sensor optical pen.

In some implementations, the distance calibration data is stored. The stored distance calibration data is subsequently utilized to determine a measurement distance from the chromatic range sensor optical pen to a surface point based on a distance indicating coordinate that is determined for the surface point based on a wavelength peak that results along the wavelength measurement axis from the measurement of the surface point.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary, to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A method for providing distance calibration data for a chromatic range sensor system with a chromatic range sensor optical pen that is coupled to a measuring machine, wherein the chromatic range sensor optical pen is configured to focus different wavelengths at different distances proximate to a surface to be measured, the method comprising:
arranging the chromatic range sensor optical pen in a relationship relative to a spherical calibration object that has a nominally spherical calibration surface;
controlling the measuring machine to achieve relative movement of the chromatic range sensor optical pen in relation to the nominally spherical calibration surface, wherein the relative movement of the chromatic range sensor optical pen is in a spiral pattern so as to perform a spiral scan of a portion of the nominally spherical calibration surface for which distance indicating data is determined as corresponding to distances between the chromatic range sensor optical pen and surface points on the nominally spherical calibration surface as the spiral scan is performed; and
determining distance calibration data for the chromatic range sensor system based on the distance indicating data.

2. The method of claim 1, wherein the determining of the distance calibration data comprises determining a relative position of each surface point in relation to a top point of the nominally spherical calibration surface.

3. The method of claim 2, wherein the determining of the distance calibration data comprises utilizing the distance indicating data collected during the spiral scan to determine a location of the top point of the nominally spherical calibration surface and the relative position of each surface point.

4. The method of claim 2, wherein the surface points on the nominally spherical calibration surface are each at a same nominal radius from a common interior center point of the spherical calibration object, and for which the top point of the nominally spherical calibration surface is directly above the common center point and correspondingly has the same X axis and Y axis coordinates as the common center point in a machine coordinate system of the measuring machine.

5. The method of claim 2, wherein the relative position of each surface point in relation to the top point corresponds to a radial position of each surface point, for which each radial position corresponds to a known difference between the Z axis coordinates of the top point and the surface point in a machine coordinate system of the measuring machine in accordance with the known geometric properties of the nominally spherical calibration surface.

6. The method of claim 5, wherein the known difference between the Z axis coordinates corresponds to at least part of a measurement distance from the chromatic range sensor optical pen to the surface point, and for each surface point, the distance indicating data comprises a distance indicating coordinate that is determined for the surface point based on a wavelength peak that results along a wavelength measurement axis from the measurement of the surface point, and for which the determining of the distance calibration data comprises correlating the distance indicating coordinate for each surface point with the measurement distance from the chromatic range sensor optical pen to the surface point.

7. The method of claim 6, comprising storing the distance calibration data, for which as part of a subsequent measurement of a surface point, a distance indicating coordinate is determined for the surface point based on a wavelength peak that results along the wavelength measurement axis from the measurement of the surface point, and the stored distance calibration data is utilized to determine a measurement distance from the chromatic range sensor optical pen to the measured surface point based on a measurement distance that is correlated with the determined distance indicating coordinate by the stored distance calibration data.

8. The method of claim 6, wherein the wavelength measurement axis is of a detector array of a wavelength detector of the chromatic range sensor system.

9. The method of claim 2, wherein the chromatic range sensor optical pen has a measurement range extending between a minimum measurement distance and a maximum measurement distance, and the arranging the chromatic range sensor optical pen in the relationship relative to the spherical calibration object includes positioning the chromatic range sensor optical pen so that the minimum measurement distance is proximate to the top point of the nominally spherical calibration surface of the spherical calibration object.

10. The method of claim 1, wherein for the performance of the spiral scan, the surface points for which the distance indicating data is determined comprise at least 100 surface points.

11. The method of claim 1, wherein the controlling the measuring machine to achieve relative movement of the chromatic range sensor optical pen in relation to the nominally spherical calibration surface includes maintaining a constant Z-height of the chromatic range sensor optical pen in a machine coordinate system of the measuring machine during performance of the spiral scan.

12. The method of claim 1, comprising:
determining intensity peak data as corresponding to an amount of light received by the chromatic range sensor optical pen for different distances between the chromatic range sensor optical pen and the nominally spherical calibration surface; and
determining intensity calibration data based on the intensity peak data, wherein the distance indicating data is determined based at least in part on the intensity calibration data.

13. The method of claim 12, wherein:
the determining intensity peak data comprises achieving relative movement of the chromatic range sensor optical pen for performing a sweep through a range of Z axis distances from the nominally spherical calibration surface while maintaining unchanged X axis and Y axis coordinates in a machine coordinate system of the measuring machine, and capturing intensity peak data during the sweep; and
the determining intensity calibration data comprises generating an intensity normalization calibration curve based on the captured intensity peak data.

14. The method of claim 12, wherein:
the determining intensity peak data comprises capturing intensity peak data during the spiral scan; and
the determining intensity calibration data comprises generating an intensity normalization calibration curve based on the captured intensity peak data.

15. A system, comprising:
a measuring machine comprising a motion controller;
a chromatic range sensor system comprising a chromatic range sensor optical pen configured to focus different wavelengths at different distances proximate to a surface to be measured, wherein the chromatic range sensor optical pen is configured to be coupled to the measuring machine;

a spherical calibration object comprising a nominally spherical calibration surface;

wherein the system is configured to:
utilize the motion controller to achieve relative movement of the chromatic range sensor optical pen in relation to the nominally spherical calibration surface, wherein the relative movement of the chromatic range sensor optical pen is in a spiral pattern so as to perform a spiral scan of a portion of the nominally spherical calibration surface for which distance indicating data is determined as corresponding to distances between the chromatic range sensor optical pen and surface points on the nominally spherical calibration surface as the spiral scan is performed; and determine distance calibration data for the chromatic range sensor system based on the distance indicating data.

16. The system of claim 15, wherein the determining of the distance calibration data comprises determining a radial position of each surface point relative to the location of a top point of the nominally spherical calibration surface, for which each radial position corresponds to a distance between the corresponding surface point and the chromatic range sensor optical pen when the measurement was taken in accordance with the geometric properties of the nominally spherical calibration surface, wherein each distance is associated with the distance indicating coordinate that is determined for the corresponding surface point as part of the determination of the distance calibration data.

17. The system of claim 15, wherein the system is further configured to store the distance calibration data, and to subsequently perform a measurement process for determining a measurement distance which corresponds to a distance between the chromatic range sensor optical pen and a surface point on a surface, for which the measurement process comprises determining a distance indicating coordinate for the surface point based on a wavelength peak that results along a wavelength measurement axis from the measurement of the surface point, and for which the stored distance calibration data is utilized to correlate the distance indicating coordinate with the corresponding measurement distance.

18. The system of claim 15, wherein the distance indicating data that corresponds to the distances between the chromatic range sensor optical pen and each surface point comprises a distance indicating coordinate that is determined for each surface point based on a wavelength peak that results along a wavelength measurement axis from the measurement of the surface point.

19. A chromatic range sensor system for use with a measuring machine and a calibration object having a nominally spherical calibration surface, the chromatic range sensor system comprising:

a chromatic range sensor optical pen configured to focus different wavelengths at different distances proximate to a surface to be measured;

an illumination source configured to generate multi-wavelength input light comprising an input spectral profile that is input to the chromatic range sensor optical pen;

a wavelength detector comprising a plurality of pixels with respective pixel positions distributed along a wavelength measurement axis of the wavelength detector, wherein the chromatic range sensor system is configured such that, when the chromatic range sensor optical pen is operably positioned relative to a surface to perform measurement operations, the chromatic range sensor optical pen inputs the input spectral profile and outputs corresponding radiation to the surface and receives reflected radiation from the surface and outputs the reflected radiation to the wavelength detector; and a processing portion configured to:
determine distance indicating data resulting from relative movement of the chromatic range sensor optical pen in relation to the nominally spherical calibration surface, wherein the relative movement of the chromatic range sensor optical pen is in a spiral pattern so as to perform a spiral scan of a portion of the nominally spherical calibration surface, from which the distance indicating data is determined as corresponding to distances between the chromatic range sensor optical pen and surface points on the nominally spherical calibration surface as the spiral scan is performed; and determine distance calibration data based on the distance indicating data.

20. The chromatic range sensor system of claim 19, wherein the distance calibration data correlates distance-indicating coordinates with measurement distances.

21. The chromatic range sensor system of claim 19, wherein the determining of the distance calibration data comprises determining a location of a top point of the nominally spherical calibration surface based at least in part on the distance indicating data obtained from the spiral scan.

22. The chromatic range sensor system of claim 19, wherein the distance calibration data comprises distance-indicating coordinates along the wavelength measurement axis of the wavelength detector which are correlated with Z axis measurement distances along a Z axis to a measured surface, for which the Z axis corresponds to an optical axis of the chromatic range sensor optical pen.

23. The chromatic range sensor system of claim 22, wherein the distance calibration data is stored and subsequently utilized to determine a measurement distance from the chromatic range sensor optical pen to a surface point based on a distance indicating coordinate that is determined for the surface point based on a wavelength peak that results along the wavelength measurement axis from the measurement of the surface point.

* * * * *